(12) United States Patent
Mitchell et al.

(10) Patent No.: US 12,481,008 B2
(45) Date of Patent: Nov. 25, 2025

(54) CAVITY CELL FOR AN OPTICALLY-PUMPED ATOMIC MAGNETOMETER AND A MAGNETIC GRADIOMETER, AND A SYSTEM COMPRISING THE GRADIOMETER AND A MICROSCOPY SYSTEM

(71) Applicants: INSTITUCIÓ CATALANA DE RECERCA I ESTUDIS AVANÇATS, Barcelona (ES); FUNDACIÓ INSTITUT DE CIÈNCIES FOTÒNIQUES, Castelldefels (ES)

(72) Inventors: Morgan Mitchell, Castelldefels (ES); Vito Giovanni Lucivero, Castelldefels (ES); Jakob Reichel, Paris (FR)

(73) Assignees: INSTITUCIÓ CATALANA DE RECERCA I ESTUDIS AVANÇATS, Barcelona (ES); FUNDACIÓ INSTITUT DE CIÈNCIES FOTÒNIQUES, Castelldefels (ES)

( * ) Notice: Subject to any disclaimer, the term of this patent is extended or adjusted under 35 U.S.C. 154(b) by 65 days.

(21) Appl. No.: 17/958,850

(22) Filed: Oct. 3, 2022

(65) Prior Publication Data
US 2023/0107226 A1 Apr. 6, 2023

(30) Foreign Application Priority Data
Oct. 1, 2021 (EP) .................................... 21382888

(51) Int. Cl.
*G01R 33/26* (2006.01)

(52) U.S. Cl.
CPC .................................. *G01R 33/26* (2013.01)

(58) Field of Classification Search
CPC ...... G01R 33/022; G01R 33/032; G01R 33/26
USPC ........................................................ 324/304
See application file for complete search history.

(56) References Cited

U.S. PATENT DOCUMENTS

| | | |
|---|---|---|
| 8,212,556 B1 | 7/2012 | Schwindt et al. |
| 2005/0206377 A1 | 9/2005 | Romalis et al. |
| 2015/0377984 A1 | 12/2015 | Nagasaka et al. |
| 2016/0282427 A1* | 9/2016 | Heidmann ............. G11B 5/012 |
| 2017/0356969 A1* | 12/2017 | Ueno .................... G01R 33/243 |

(Continued)

OTHER PUBLICATIONS

European Search Report corresponding to EP Patent Application No. 21382888.2 dated Mar. 25, 2022.
(Continued)

*Primary Examiner* — Farhana A Hoque
(74) *Attorney, Agent, or Firm* — Jenkins, Taylor & Hunt, P.A.

(57) ABSTRACT

Provided is a cell for optically-pumped atomic magnetic gradiometry that includes a first confining chamber containing alkali atoms and configured to receive a co-propagating pump and probe light beam, including pump light polarized to spin polarize the alkali atoms, and at least a second confining chamber containing alkali atoms, distanced from the first confining chamber, and which is also configured to receive a co-propagating pump and probe light beam. Also provided are an optically-pumped atomic magnetic gradiometer including the presently disclosed and a system that includes the presently disclosed gradiometer and a microscopy system.

12 Claims, 11 Drawing Sheets

(56) References Cited

U.S. PATENT DOCUMENTS

2017/0360322 A1    12/2017  Ueno
2021/0239779 A1*   8/2021   Turner ................. G01R 33/389

OTHER PUBLICATIONS

Perry et al. (2020) "An all-optical atomic gradiometer with sub-20 fT/cm/√Hz sensitivity in a 22 µT earth-scale magnetic field," retrieved from https://arXiv.org, Cornell University Library, Ithaca, NY.

* cited by examiner

CAVITY CELL FOR AN OPTICALLY-PUMPED ATOMIC MAGNETOMETER AND A MAGNETIC GRADIOMETER, AND A SYSTEM COMPRISING THE GRADIOMETER AND A MICROSCOPY SYSTEM

CROSS-REFERENCE TO RELATED APPLICATIONS

This application is based on and claims the benefit of priority from European Patent Application No. 21382888, filed on Oct. 1, 2021, the contents of which are expressly incorporated by reference herein.

This project has received funding from the European Union's Horizon 2020 research and innovation programme under grant agreement No. 820393.

TECHNICAL FIELD

The present invention generally relates, in a first aspect, to a cell for an optically-pumped atomic magnetic gradiometer, and particularly to a multi-chamber cell.

A second aspect of the present invention relates to an optically-pumped atomic magnetic gradiometer including the cell of the first aspect.

A third aspect of the present invention relates to a system, comprising the gradiometer of the second aspect and a microscopy system.

BACKGROUND

A cell for an optically-pumped atomic magnetic gradiometer comprising a confining chamber containing alkali atoms, wherein the confining chamber is configured to receive a co-propagating pump and probe light beam, including pump light polarized to spin polarize the alkali atoms, is known in the prior art.

That's the case of the cell disclosed in Perry et al, "All-optical intrinsic atomic gradiometer with sub-20 fT/cm/√Hz sensitivity in a 22 μT earth-scale magnetic field", Optics Express Vol. 28, Issue 24, pp. 36696-36705 (2020).

However, the cell described in that paper includes only a single confining chamber, having a first measuring zone which is traversed by a co-propagating pump and probe light beam entering from a front face of the cell and exiting through a back side of the cell, and a second measuring zone which is traversed by a co-propagating pump, entering from the same front face, and probe light beam entering from the back face of the cell and exiting through its front side, and that is formed by the combination of the probe light beam that has exited the first zone, and which has been retro reflected, and a further pump beam.

For the experimental setup disclosed in said paper, the first and second measuring zones of the cell are spaced 4 cm along the long axis of the cell, while the cell has inner dimensions 5 mm×5 mm×50 mm.

A drawback of said paper is that the probe beam enters from the front side of the cell, in the first measuring zone, and from the back face of the cell, in the second measuring zone. This is not practical to get a magnetic sample close to the cell on one side, because both faces of the cell include pump/probe optics or optical detection stage.

Another drawback in that paper is the size of the cell, which couldn't be made smaller as that would make the two measuring zones of the single confining chamber to be too close, which would cause atoms to diffuse within both measuring zones, and thus make those two measuring zones practically a single measuring zone.

Alternatively to the above prior art disclosure and to the present invention, there are proposals known in the art that do not refer to a cell for an optically-pumped atomic magnetic gradiometer but to a plurality of cells for optically-pumped atomic magnetic gradiometry, whether forming a cell array or a plurality of separate cells of a plurality of respective physically separated magnetometers. In all those cases, each cell comprises only one confining chamber.

Having separate magnetometers or a plurality of cells to form an array is a drawback because different cells in physically separated magnetometers can have different sources of uncorrelated noise, e.g., different fluctuations in temperature and atomic density in separated cells, and this results in noise excess in a gradiometer implementation, e.g., when a differential measurement is performed.

It is therefore necessary to offer an alternative to the state of the art, which covers the gaps mentioned above, particularly by providing a cell for an optically-pumped atomic magnetic gradiometer which does not have the above-mentioned drawbacks.

SUMMARY

To that end, the present invention relates, in a first aspect, to a cell for an optically-pumped atomic magnetic gradiometer, comprising a confining chamber containing alkali atoms, wherein the confining chamber is configured to receive a co-propagating and pump and probe light beam, including pump light polarized to spin polarize the alkali atoms.

In contrast to the cells of the prior art, in the one proposed by the first aspect of the present invention, the above-mentioned confining chamber is a first confining chamber, and the cell comprises at least a second confining chamber containing alkali atoms, distanced from the first confining chamber, and which is also configured to receive a co-propagating and pump and probe light beam.

In other words, in the cell of the first aspect of the present invention, each of the two measuring zones used to perform gradiometric measurements is provided by a respective confining chamber.

By means of the cell of the present invention, only a single cell works as a standalone magnetic gradiometer. In this arrangement, fluctuations of temperature and atomic density in confining chambers within the same cell are correlated. In a differential measurement, this common noise is canceled resulting in an improvement of the gradiometer magnetic sensitivity.

For an embodiment, the first and second confining chambers are configured either to receive two respective co-propagating and pump and probe light beams from the same side of the cell but striking at different regions thereof at the same time or to receive the same co-propagating pump and probe beam from the same side of the cell but striking at different regions at different times.

According to an embodiment, the first and second confining chambers are coplanar, and distanced from each other from 100 μm to 10 mm, along a plane occupied by both the first and the second confining chamber.

The cell of the first aspect of the present invention further comprises, for an embodiment, top and bottom walls arranged at and covering opposite ends of at least the first and second confining chambers, each of said first and second walls having a partial reflectivity for said pump and probe lights, to make an optical cavity for probe light This is on contrast to Perry et al, where the cell there disclosed does not make use of optical cavity and the probe undergoes single pass in both interaction areas within the same cell.

For an implementation of that embodiment, each of the top and bottom walls has different partial reflectivities for the pump and probe lights, above 90% for the probe light and below 50% for the pump light.

Preferably, in the cell of the first aspect of the present invention each of the top and bottom walls has a thickness below 1 mm.

According to an embodiment, the first and second confining chambers have a confinement height below 1 mm, therefore constituting a microcell, as the atomic interaction length is below 1 mm.

Thus, with such a low atomic interaction length at a sub-mm scale and, on the other hand, by having separated measurement zones within different confining chambers to avoid the same atoms to diffuse within a single measuring zone in a gradiometer mode of operation, a sub-mm spatial resolution is achieved. This is not possible with the cell disclosed in Perry et al., due to the size of the cell there disclosed and also due to the fact that the cell there described has a single confining chamber.

For an implementation of that embodiment, each of the first and second walls has a thickness ranging between 100 μm and 3 mm. This will change the free spectral range of the optical cavity, but not the atomic interaction length, the confinement height which is the important parameter to say the cell is a microcell.

For an embodiment, the first and second confining chambers further contain a buffer gas at a pressure above 3 bar and up to 20 bar, to prevent atomic depolarizing collisions.

According to an embodiment, the at least first and second confining chambers comprise at least two physics chambers, the cell comprising further confining chambers including a reservoir and connecting channels fluidically communicating the at least two physics chambers with the reservoir.

For different implementations of that embodiment, the at least two physics chambers have a width (when, for example, rectangular) or diameter (when circular) ranging from 100 μm to 10 mm, preferably from 400 μm to 5 mm.

According to an embodiment, the first, second and further confining chambers are laterally demarcated by intermediate partition and contour walls arranged between and bonded to the top and bottom walls, wherein the first, second and further confining chambers are gas-tight sealed from the environment by the intermediate partition and contour walls and top and bottom walls.

For an embodiment, each of the top and bottom walls comprises a respective structure that is transparent to the pump and probe lights, and a respective optical coating on an external face of each of the transparent structures, wherein the optical coatings provide the above-mentioned partial reflectivities, thus making the cell become an optical cavity cell. A higher sensitivity is obtained through these optical coatings.

Alternatively, the top and bottom walls could provide those reflectivities, not with an optical coating but with an inner structure of those walls.

For an embodiment, the outer surfaces of the top and bottom walls are planar, while for other embodiments they are machined with curvature to match a pseudo collimated Gaussian beam, which, for some embodiments, has a beam waist comparable to the sub-mm thickness of the interaction length.

In a second aspect, the present invention relates to an optically-pumped atomic magnetic gradiometer, comprising:
  a cell according to the first aspect of the present invention (for any of its embodiments);
  illumination means (or illumination mechanism) configured to generate:
    a first co-propagating pump and probe light beam and a second co-propagating pump and probe light beam, and to direct the first and second co-propagating pump and probe light beams to different regions of the same side of the cell, namely a front side, such that:
      the first co-propagating pump and probe light beam enters the first confining chamber, and the second co-propagating pump and probe light beam enters the second confining chamber; or
      the first co-propagating pump and probe light beam enters a first portion of the first or second confining chamber, and the second co-propagating pump and probe light beam enters a second portion of the first or second confining chamber; or
    a same co-propagating pump and probe light beam, and to direct the same co-propagating pump and probe light beam to different regions of the same side of the cell, namely a front side, such that:
      the same co-propagating pump and probe light beam enters different portions of the first or second confining chamber; or
      the same co-propagating pump and probe light beam is scanned to impinge at least the first and second confining chambers at different times;
  a measuring unit configured and arranged to receive at least part of the probe lights of the first and second co-propagating pump and probe light beams or of the same co-propagating pump and probe light beam, once coming out of the cell, in the form of first and second probe light beams, and perform a differential measurement between then, on at least one parameter of those probe light beams, to obtain a magnetic gradiometry measurement.

In contrast to the gradiometer disclosed in the prior art paper disclosed in the previous section, in the one of the second aspect of the second invention, both the first and second co-propagating probe and pump beams, or the same co-propagating pump and probe light beam, enter each measuring zone from the front side of the cell.

According to a first main embodiment of the optically-pumped atomic magnetic gradiometer of the second aspect of the present invention, the optically-pumped atomic magnetic gradiometer operates according to a transmission detection mode, wherein the optically-pumped atomic magnetic gradiometer further comprises:
  polarizing means (or polarizing mechanism) configured and arranged for linearly polarizing the probe light and circularly polarizing the pump light, of the first and second co-propagating pump and probe light beams, before they strike the front side of the cell; and
  first and second optical components configured and arranged to respectively receive the first and second co-propagating pump and probe light beams, once coming out of the cell through a back side of the cell opposite to said front side, and transmit only the probe light contained in those beams, in the form of said first and second probe light beams;
wherein the measuring unit comprises first and second polarimeters configured and arranged to respectively receive said first and second probe light beams, and to detect Faraday rotation, and wherein said at least one parameter on which the measuring unit is configured to perform said differential measurement is Faraday rotation.

For some embodiments, the illumination means (or illumination mechanism) comprise pump and probe laser sources, and associated optics.

For some implementations, the polarizing means (or polarizing mechanism) of the first main embodiment of the optically-pumped atomic magnetic gradiometer of the second aspect of the present invention comprise any arrangement suitable to perform the above-mentioned linear polarization for the probe light and circularly polarization for the probe light, such as but not limited to a multi-order waveplate, a dichroic waveplate, or the polarization of pump and probe is fixed before they are combined on the same output mode of a dichroic mirror (instead of being fibre coupled) in free space.

For an implementation of that first main embodiment, the bottom wall defines said front side of the cell and has a reflectivity for the probe light ranging between 90% and 99% and for the pump light below 50%, the latter preferably adjustable to get enough transmitted pump intensity to fully polarize the atomic ensemble, and the top wall has a reflectivity for the probe light ranging between 98% and, 99.9%, and either fully reflects the pump light or partially transmits it. These reflectivity values give a finesse of the optical cavity for the probe light ranging from 50 to 1000, preferably from 100 to 500. Optionally, a filter is placed after the cell so that only probe light reaches the detectors of the measuring unit.

According to a second main embodiment of the optically-pumped atomic magnetic gradiometer of the second aspect of the present invention, the optically-pumped atomic magnetic gradiometer operates according to a reflection detection mode, further comprising:

polarizing means (or polarizing mechanism) configured and arranged for circularly polarizing both the probe light and the pump light, of the first and second co-propagating pump and probe light beams, before they strike the front side of the cell; and wherein:

the measuring unit is configured to receive the first and second probe light beams of the first and second co-propagating pump and probe light beams, once coming out of the cell, by reflection, through the front side of the cell, and the above-mentioned at least one parameter on which the measuring unit is configured to perform the above-mentioned differential measurement is:

light intensity of the first and second probe beams; or

PDH error signals provided by a Pound-Drever-Hall detection arrangement.

For an implementation of both, the first and the second main embodiments, since the pump light is also reflected, an interference filter is added to filter out the pump light at the detection stage, while detecting probe light only.

According to an implementation of the second main embodiment of the optically-pumped atomic magnetic gradiometer, the bottom wall defines the front side of the cell and has a reflectivity for the probe light ranging between 90% and 99% and for the pump light below 50%, the latter preferably adjustable to get enough transmitted pump intensity to fully polarize the atomic ensemble, and the top wall has a reflectivity for the probe light ranging between 90% and 99%, to almost fully reflect the pump light. Optionally, a filter is placed before the detectors of the measuring unit so that only probe light reaches those detectors.

For some implementations, the polarizing means (or polarizing mechanism) of the second main embodiment of the optically-pumped atomic magnetic gradiometer of the second aspect of the present invention comprises any arrangement suitable to perform the above-mentioned linear polarization for the probe light and circularly polarization for the probe light, such as but not limited to a polarizing beam splitter and a quarter waveplate.

For an embodiment of the optically-pumped atomic magnetic gradiometer of the second aspect of the present invention the probe light is locked on resonance with the cell but detuned from atomic resonance of the alkali atoms, so that absorption of probe light is negligible, and the measurement is dispersive.

The present invention further relates, in a third aspect, to a system comprising:

the optically-pumped atomic magnetic gradiometer of the second aspect of the present invention, in the reflection mode;

a microscopy system configured and arranged to obtain microscopy information about a sample placed on or above a back side of the cell opposite to its front side; and a processing unit operatively connected to the measuring unit of the optically-pumped atomic magnetic gradiometer and to the microscopy system and configured to respectively receive magnetic gradiometry measurements and microscopy information and process them according to a correlation analysis.

In a fourth aspect, the present invention relates to a method for fabricating the cell for an optically-pumped atomic magnetic gradiometer of the second aspect of the present invention, comprising providing its first and second confining chambers and filling the same with the alkali atoms, wherein the first and second confining chambers are configured to receive respective co-propagating pump and probe light beams, or the same co-propagating pump and probe beam, including pump light polarized to spin polarize the alkali atoms.

A method like the one of the fourth aspect of the present invention, but for fabricating a cell for atomic sensing and metrology applications, is also disclosed in the present document, and could be object of a further invention.

According to an embodiment, the method of the fourth aspect of the present invention further comprises providing and arranging top and bottom walls at opposite ends of at least the first and second confining chambers, such that said opposite ends are covered by the top and bottom walls, each of the first and second walls having a partial reflectivity for the pump and probe lights.

For an embodiment, the method of the fourth aspect of the present invention comprises sequentially performing the following steps:

a) performing an anodic bonding between at least a structure of the bottom wall and a bottom face of a middle layer made of an etchable material;

b) etching said middle layer to define said at least first and second confining chambers at respective etched areas of the middle layer, wherein non-etched portions of the middle layer define intermediate partition and contour walls laterally demarcating the confining chambers;

c) filing at least part of the confining chambers with the alkali atoms; and d) performing an anodic bonding between at least a structure of the top wall and an upper face of said intermediate partition and contour walls.

According to an embodiment, the at least first and second confining chambers have a confinement height below 1 mm, wherein:
   step b) comprises etching the middle layer to define a reservoir, at least two physics chambers, constituting said first and second confining chambers, and connecting channels fluidically communicating said at least two physics chambers with said reservoir; and
   step c) comprises filing said reservoir with a solution comprising an alkali metal compound dissolved in at least one of its solvents, and evaporating said at least one solvent, or filling the reservoir directly with an alkali vapour and a buffer gas.

For an implementation of said embodiment, for which the above-mentioned solution has been introduced into the reservoir, the method further comprises performing, after step d), a step of decomposing the alkali metal compound in alkali metal, constituting said alkali atoms, and a buffer gas at a pressure above 3 bar. According to a variant of that implementation, to get such a high pressure for the buffer gas, the method comprises micro-pipetting an amount of the alkali metal compound, such as $RbN_3$ (rubidium azide), in aqueous solution higher than 1 microliter, higher than 3 microliters to get such a high pressure, up to 10 bar. Having such a high volume of the alkali metal compound allows to get high buffer gas pressure after chemical reaction. The activation occurs in the reservoir and then alkali atoms and buffer gas flow through the connecting channels up to the physics chambers.

According to another implementation of that embodiment, for which the reservoir has been filled directly with an alkali vapour and a buffer gas, the method comprises fluidically connecting the reservoir to a gas line to back-filled the cell with the desired alkali vapour and buffer gas amount and then seal the cell with conventional glass-blowing technique. The alkali atoms of the filled alkali vapour and the filled buffer gas will flow through the connecting channels up to the physics chambers.

The alkali metal compound is, for some embodiments, one or more of an azide, a solid-state dispenser, pure alkali metal or reaction between barium azide and alkali (Rb) chloride or mix of Rb salt and CaCl to get pure Rb.

According to an embodiment, the step of decomposing the alkali metal compound is performed by UV irradiating the alkali metal compound through at least one of the structures of the top and bottom walls that is at least partially transmissive to UV radiation.

The structures of the top and bottom walls are, for an embodiment, transparent to the pump and probe lights, and the method of the fourth aspect of the present invention further comprises, respective steps e) and f) of coating an external face of each of said transparent structures with a respective optical coating providing said partial reflectivities. These steps can be performed before or after the above-mentioned step of decomposing the alkali metal compound. In case the decomposing is performed by UV irradiation, if steps e) and f) are to be performed before that decomposition, the coatings must be at least partially transmissive to UV radiation.

Alternatively, for another embodiment, the method of the fourth aspect of the present invention comprises coating an external face of each of the transparent structures of the top and bottom walls with a respective optical coating, before they are anodically bonded at steps a) and d) respectively.

BRIEF DESCRIPTION OF THE FIGURES

In the following some preferred embodiments of the invention will be described with reference to the enclosed figures. They are provided only for illustration purposes without however limiting the scope of the invention.

FIG. 9A shows exemplary transmitted intensity and FIG. 9B microcavity-enhanced Faraday rotation, for one gradiometer channel.

FIG. 10A shows the reflected intensity around a cavity resonance frequency corresponding to far-detuning ($\Delta$=95 GHz) from atomic resonance. In FIG. 10B free-induction-decay of the reflected intensity for the two conditions with an amplitude improvement for higher finesse is plotted. FIG. 10C plots the PDH error signal of FIG. 10A. FIG. 10D plots the precession of the error signal, which is proportional to the offset from cavity resonance, that can be used to perform the magnetic field measurement.

DETAILED DESCRIPTION

Figure 2A:
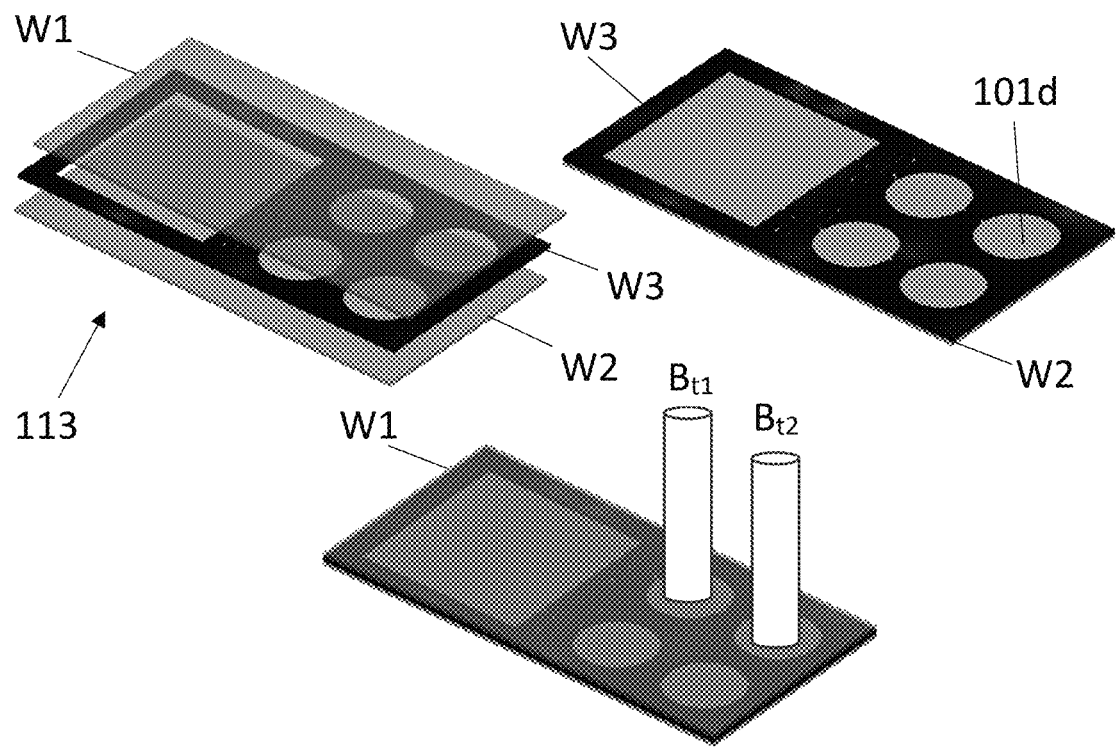
FIG. 2A illustrates, by means of three schematic perspective views, the cell of the first aspect of the present invention, for an embodiment for which the cell is a cavity cell.
Figure 2B:
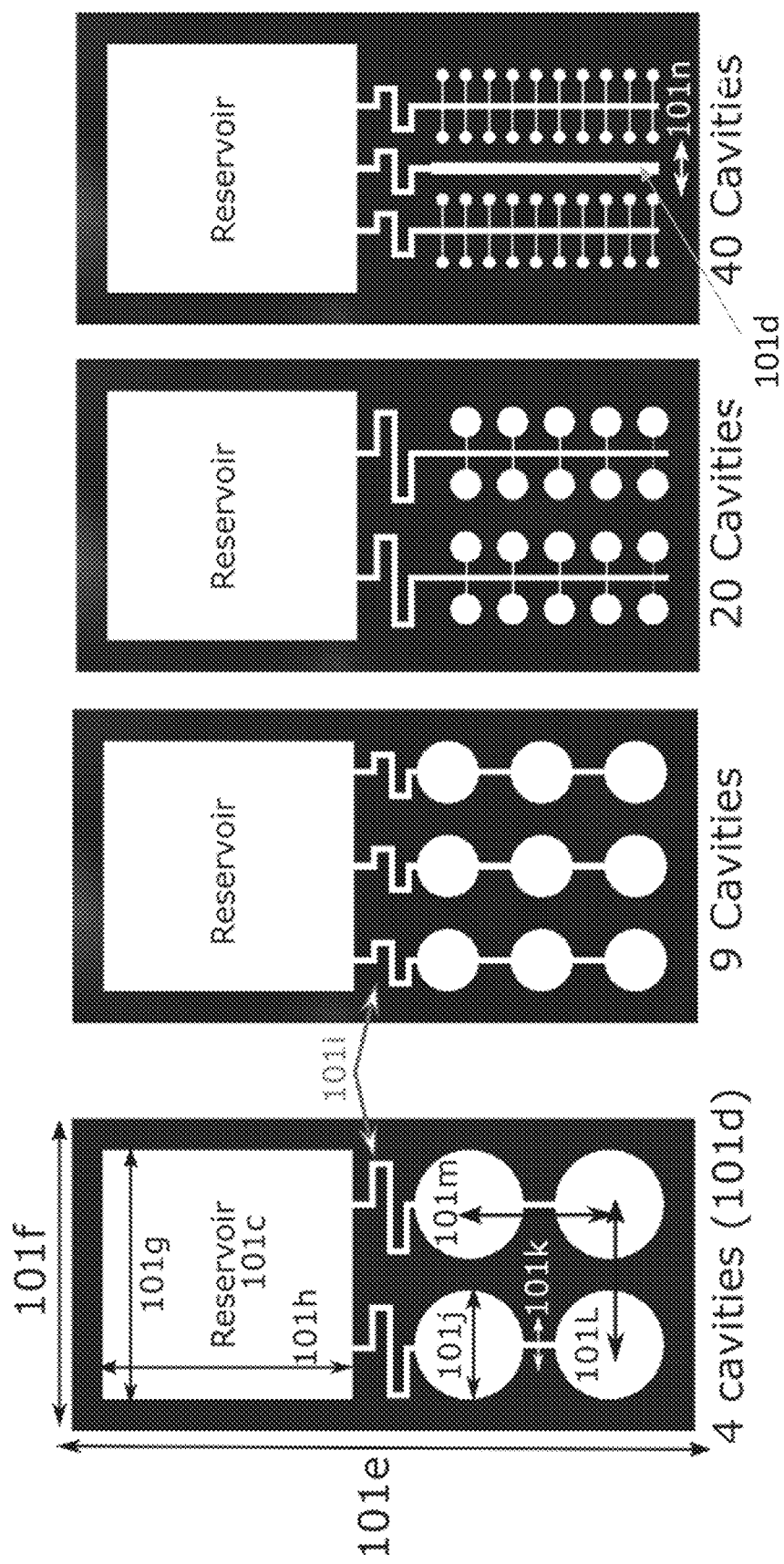
FIG. 2B schematically illustrates the geometry of different arrangements of confining chambers of the cell of the first aspect of the present invention, particularly for a cavity cell, for four different embodiments illustrated by four corresponding plan views.

FIGS. 2A and 2B illustrate the cavity cell of the first aspect of the present invention, for an embodiment for which the cavity cell 113 comprise three thin substrates or walls, W1, W2, W3: two glass substrates with optically coated outer surfaces and inner surfaces bonded to a middle wafer (such as a silicon wafer) which is etched with the desired geometry for atomic interaction (shown in FIG. 2B).

FIG. 2A, bottom view, shows co-propagating probe and pump beams Bt1 striking at one of the confining chambers at time t1 and co-propagating probe and pump beams Bt2 striking at another of the confining chambers at time t2. For an embodiment, Bt1 and Bt2 are the same beams and t1/t2, while for another embodiment Bt1 and Bt2 are not the same beams and t1=t2.

Specifically, the left upper view and bottom view of FIG. 2A are an exploded and assembled respective views of the cavity cell 113 formed by a top wall/substrate W1 and bottom wall/substrate W2 arranged at and covering opposite ends of several confining chambers, including physical cavities 101d, defined in a middle wafer which is etched so that the confining chambers are defined and laterally demarcated by intermediate partition and contour walls W3 (i.e., by the material of the wafer which has not been etched).

The right upper view of FIG. 2A shows the intermediate partition and contour walls W3, the defined confining chambers and the bottom wall/substrate W2. This results in the so-called "preform" of the cavity cell of the first aspect of the invention.

In FIG. 2B, different arrangements of confining chambers of the cavity cell 113 are shown, particularly, from left to right, a 4-, 9-, 20- and 40-physical cavities arrangement, fluidically communicated through connecting channels 101i-101k to a reservoir 101c, all of them being laterally demarcated by the intermediate partition and contour walls W3 and delimited at the top and bottom by the top W1 and bottom W2 walls/substrates respectively.

For some embodiments, the cavity diameter 101j ranges from 3.5 mm (4 cavities) down to 400 micron (40 cavities). The reservoir 101c can be round or squared with each side 101g/101h up to 10 mm. The outer dimensions 101f and 101e can range from few cm to tens of mm. The channels 101i-101k connecting the reservoir 101c with the round cavities 101d can have a width from hundreds of microns, e.g., 200 µm, down to tens of micron.

A gradiometer operation mode is enabled by probing different physics cavities 101d with baseline 101L and 101m, ranging from 5 mm to hundreds of microns, in the two dimension respectively, with parallel beams or by probing the same physics chamber 101d. For some embodiment, the same pump and probe beam strikes on different physics cavities at different times. The probing of multiple cavities, e.g., 20 or 40 cavities, enables high-order gradiometer measurements with sub-mm spatial resolution. Some of the physics cavities 101d can be formed by a microchannel, shown in the 40 cavities FIG. 2B, with width 101n that ranges from tens to hundreds of microns.

Figure 3:
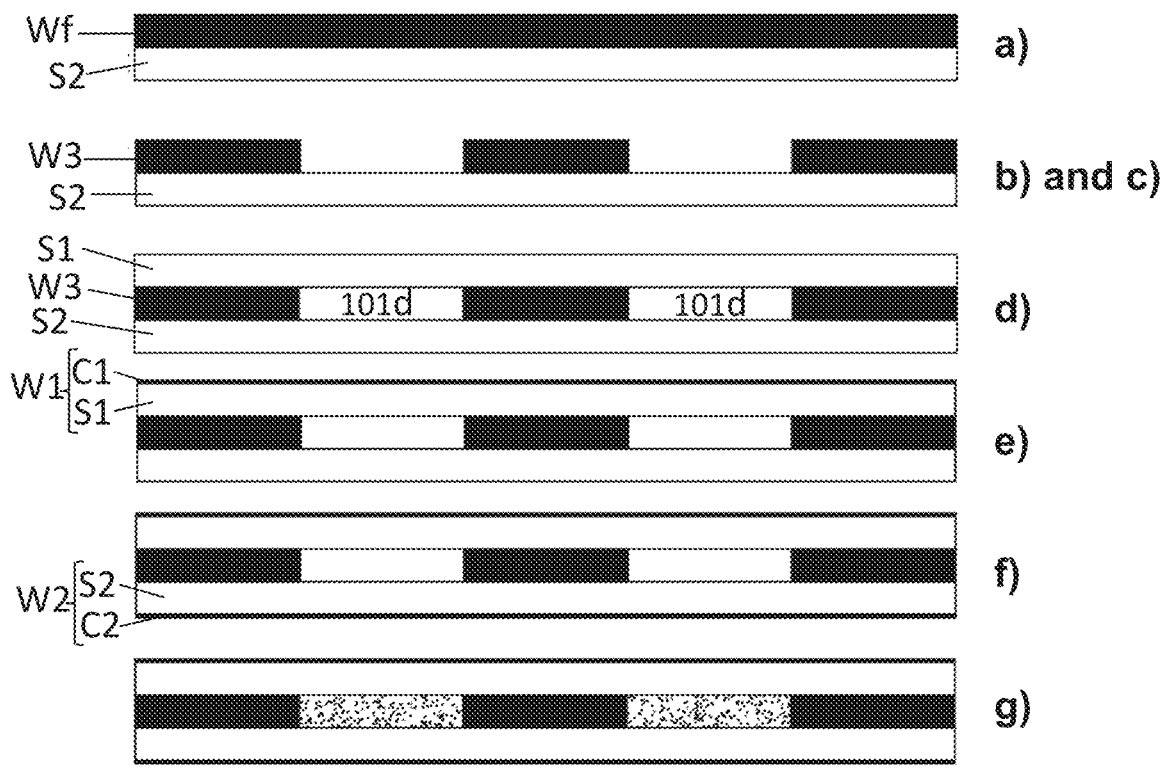
FIG. 3 illustrates the fabrication steps of the cavity cell of the first aspect of the present invention, according to the method of the fourth aspect, for an embodiment.

In FIG. 3, the fabrication steps of the cavity cell 113 are described, according to an embodiment of the method of the fourth aspect which comprises sequentially performing the following steps:

a) performing an anodic bonding between a structure S2 (generally a transparent structure, such as a glass structure, for example made of BOROFLOAT® glass) of the bottom wall/substrate W2 and a bottom face of a middle layer Wf made of an etchable material;

b) machining (for example by wet etching) the middle layer Wf (such as a silicon wafer) to define the different confining chambers, including physical cavities 101d, reservoir 101c and connecting channels 101i, 101k, at respective etched areas of the middle layer Wf, wherein non-etched portions of the middle layer define the above-mentioned intermediate partition and contour walls W3 laterally demarcating the confining chambers, and thus providing the illustrated pre-form;

c) filing the reservoir 101c (not shown in FIG. 3) with a solution comprising an alkali metal compound, for example $RbN_3$, dissolved in at least one of its solvents, and evaporating said at least one solvent, or filling the reservoir directly with an alkali vapour and a buffer gas;

d) after water evaporation of those solvents, performing an anodic bonding between the filled preform, specifically between an upper face of the intermediate partition and contour walls W3, and a structure S1 (generally a transparent structure, such as a glass structure, for example made of BOROFLOAT® glass) of the top wall/substrate W1;

e) the outer surface of structure S1 is coated with a coating C1 with the desired reflectance for probe and pump beam (high reflectance for probe and high transmittance for the pump), thus forming top wall/substrate W1;

f) the outer surface of structure S2 is coated with a coating C2 with the desired reflectance for probe and pump beam (high reflectance for probe and high transmittance for the pump), thus forming top wall/substrate W1.

Alternatively, step f) is performed before step e).

The outer surfaces reflectance for the probe light can range between 90% and 99.99%, depending on the desired trade-off between finesse and residual absorption as well as on the measurement method, in transmission or reflection. The pump transmittance is 50% or higher, a partial reflection can be a pro for full atomic polarization.

Finally, a step e) for activation of the alkali compound, e.g., Rb and $N_2$, is performed (g).

The full cavity microcell length (i.e., the height of the illustrated stack) is $L=L_1+L_2+L_3$. For some embodiments, the top wall/substrate W1 can have thickness $L_1$ ranging between 100 µm and few mm, depending on the desired cavity free spectral range $\Delta v_{FSR}=c/2$ L. the middle silicon wafer Wf, and thus the partition and contour walls W3, has sub-mm thickness $L_2$, e.g., 100 or 200 µm, to enable sub-mm interaction volume and spatial resolution, and the bottom wall/substrate W2 also has sub-mm thickness $L_2$, e.g., 200 µm, allowing for sub-mm stand-off distance from a sample.

Physics Principles for Microcavity-Enhanced Magnetometry:

Before describing further embodiments of the present invention, some concepts useful to understand the same are briefly explained below with reference to FIG. 1, specifically, the physics of the cavity-enhanced magnetometry for a single probe beam interacting with a cavity microcell after optical pumping.

Figure 1:
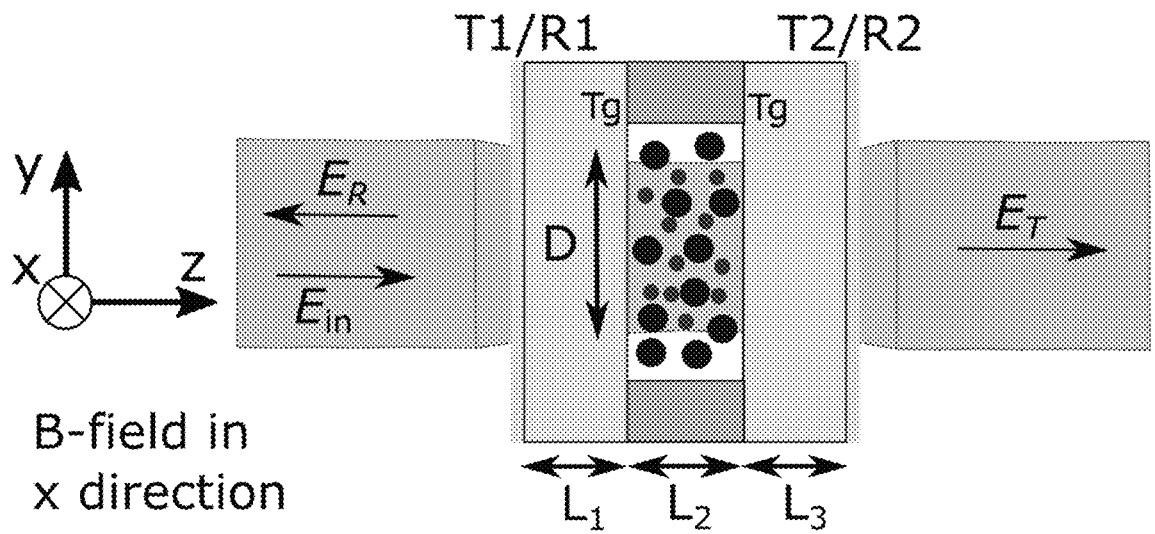
FIG. 1 schematically illustrates a cavity microcell for optical magnetometry, which is not part of the present invention, to explain the physics of the cavity-enhanced magnetometry for a single probe beam interacting with the cavity microcell after optical pumping.

As shown in FIG. 1, the input probe field Ein can be linearly polarized for detection in transmission or circularly polarized with σ+ or σ− polarization for detection in reflection, while ET (ER) is the transmitted (reflected) electric field. The probe beam diameter D is twice the waist radius at the centre of the atomic interaction length L2. The optical cavity for the probe is generated by optical coating the outer surfaces of the glass substrates with reflectance R1 (T1=1-R1) and R2 (T2=1-R2), respectively (considering a reflectance RG (Tg=1-Rg) for the inner surfaces).

As described further below, for some embodiments, according to the present invention pump and probe are collinear and pulsed optical pumping (Bell-Bloom like) generates high atomic polarization $P_z=2\langle S_z\rangle$, where $\langle S_z\rangle$ is the averaged electron spin component along the pump/probe direction z, transverse with respect to the magnetic field $\vec{B}$ to be measured, which points in the x direction. After the pump laser is switched off, atomic spins freely precess in the transverse x-y plane at the Larmor frequency $\omega_L=\gamma B_x$ before relaxation, so that $$P_z(t) = P_z(0)\cos(\omega_L t)e^{-\frac{t}{T_2}},$$

where $\gamma$ is the alkali gyromagnetic ratio and $T_2$ is the transverse relaxation time. The magnetic field magnitude is obtained from a highly sensitive measurement of the Larmor frequency, since the gyromagnetic ratio is known. The presence of the atomic ensemble as well as the atomic polarization evolution modify the interaction length, hence the total cavity microcell length, by L2→n$^\pm$L2 where n$^+$ and n$^-$ are the indexes of refraction for $\sigma^+$ and $\sigma^-$ circular polarization respectively. These are given, as a function of probe linear frequency v and time, by:

$$n^+(v, t) = 1 + \left(\frac{P_z(t)}{2} + 1\right) \times \frac{nr_e c^2 f_{osc}}{4v}D(v)$$

$$n^-(v, t) = 1 + \left(1 - \frac{P_z(t)}{2}\right) \times \frac{nr_e c^2 f_{osc}}{4v}D(v)$$

where n is the atomic number density, $r_e$ is the electron radius, c is the speed of light, $f_{osc}$ is the oscillation strength of the rubidium $D_2$ line and $$D(v) = (v - v_0)\bigg/\left[(v - v_0)^2 + \left(\frac{\Gamma}{2}\right)^2\right]$$

is a dispersion profile centered at the $v_0$ atomic resonance, e.g., the central D2 line, with buffer gas pressure broadened linewidth $\Gamma$.

For the gradiometer of the second aspect of the present invention operation according to a transmission detection mode (FIG. 7 and associated description below) the probe light is linearly polarized and locked on resonance with the cavity microcell at frequency $v_{cav}$, but far detuned from atomic resonance, $\Delta=v_{cav}-v_0\gg 10$ GHz. After propagation through the atomic interaction length $L_2$, the input electric field $E_{in}$ becomes $E_{out}$, $=E_{in}$ $(\cos(\phi)\hat{x}-\sin(\phi)\hat{y})$ undergoing paramagnetic Faraday rotation $$\phi(t) = \phi_0 \sin(\omega_L t)e^{-\frac{t}{T_2}},$$

where the maximum rotation amplitude is:

$$\phi_0 = \frac{nr_e f_{osc}}{2\Delta}G(\mathcal{F})L_2 P_X \qquad \text{Eq. 1}$$

Here we introduce $G(\mathcal{F})>1$ as the cavity-enhanced gain due to the optical cavity with finesse $\mathcal{F}$, in contrast with the single-pass scenario where $G(\mathcal{F})=1$. All details of the embodiment for detection in transmission are given below with reference to FIG. 7.

For the gradiometer of the second aspect of the present invention operation according to a reflection detection mode (FIG. 8 and associated description below) the probe is circularly polarized and locked on resonance with the cavity microcell at frequency $v_{cav}$, again far detuned from atomic resonance, $\Delta=v_{cav}-v_0\gg 10$ GHz. In this configuration, the atomic polarization induced displacement L2'→n±(t)L2 is measured by detecting the reflected intensity $|E_R|^2$ in a photodiode, whose signal is fed into a PDH frequency locking system to generate an error signal. When the laser frequency is close to cavity resonance, the error signal is proportional to the total cavity displacement $\Delta L=L2(n\pm-1)$ as well as to the cavity gain:

$$\varepsilon = DG(\mathcal{F})\delta v_{cav} \text{ with } D = \frac{8\sqrt{P_c P_s}}{\delta v}$$

where $$\delta v_{cav} = v'_{cav} - v_{cav} = -\frac{v'r_{cav}}{L}$$

$\Delta L$ is the linear change in laser frequency following the cavity displacement $\Delta L$, D is the usual PDH slope, $P_c$ and $P_s$ are the powers of carrier and first order sideband of the error signal, while $\delta v$ is the cavity microcell linewidth. We note that the cavity has the effect to enhance the error signal slope, as well as increasing carrier and sideband powers. All details of the embodiment for detection in reflection are given below with reference to FIG. 8.

Cavity Microcell Buffer Gas Optimal Pressure and Fundamental Magnetic Sensitivity:

The magnetic sensitivity of the cavity microcell of the first aspect of the present invention, when used as an optically-pumped magnetometer (OPM), is proportional to the total relaxation $\Gamma_{rel}$:

$$\Gamma_{rel}=R_{WD}+R_{BG}+R_{SE}+R_{SD}$$

including spin-exchange $R_{SE}$ and spin-destruction $R_{SD}$ rates between Rb atoms and collisions with buffer gas $R_{BG}$. The first term due to relaxation rate with internal walls is particularly relevant in the cavity microcell, for sub-mm active volume, and is given by:

$$R_{WD} = \left[\left(\frac{\pi}{L}\right)^2 + \left(\frac{2.405}{r}\right)^2\right]D_0 \frac{760}{\varrho_{N_2}}\sqrt{\frac{T}{273.15}}\frac{(273.15+T)}{273.15}$$

where $\varrho_{N_2}$ is the nitrogen pressure in Torr, $D_0$ is the diffusion constant between rubidium and nitrogen, L and r are the cell length and beam waist (radius), respectively.

Figure 4:
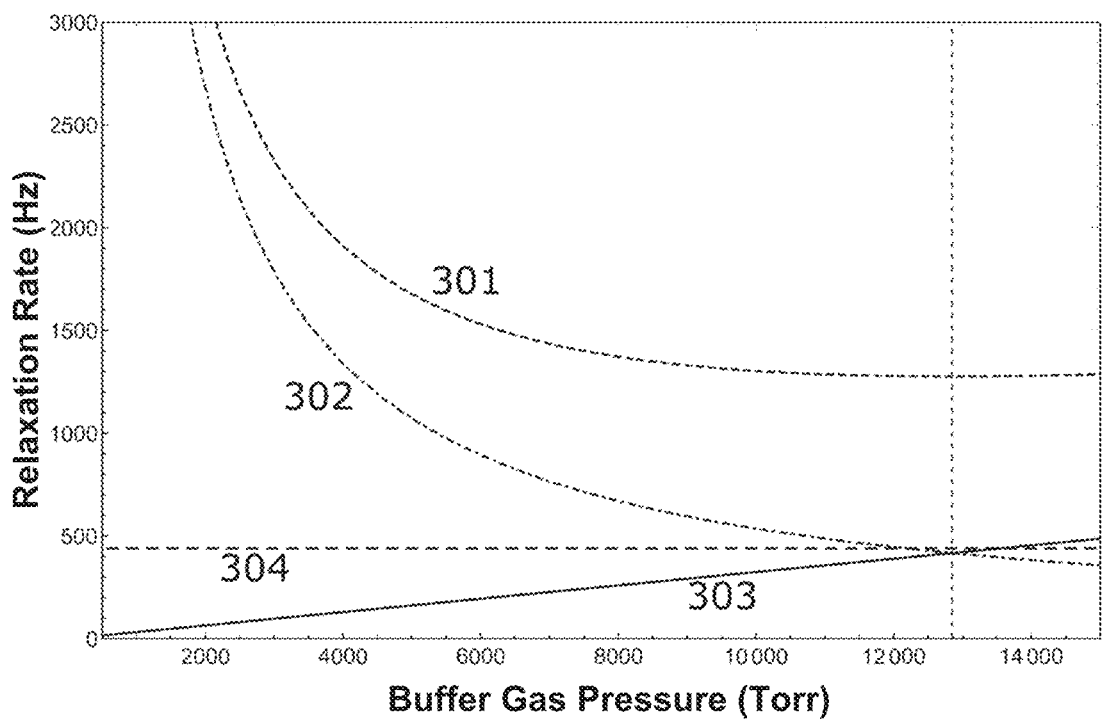
FIG. 4 illustrates optimal buffer gas pressure for the cell of the first aspect of the present invention, for an embodiment for which the cell is a cavity microcell, i.e., with a confinement height below 1 mm.

As optimization example for the cavity microcell, FIG. 4 shows different contributions to relaxation due to diffusion to the walls by wall collisions 302, $N_2$-Rb spin-destruction 303, Rb-Rb spin-exchange 304 and total relaxation rate 301 for an interaction length $L_2$=200 µm and a beam diameter D=2r=400 µm. In the presence of spin-exchange collisions, at a temperature of T=120° C. (FIG. 4), a plateau starts at about 10 bar with a minimum relaxation rate of about 1.2 kHz, at about 17 bar. For operation near-zero magnetic field, in the spin-exchange-relaxation-free (SERF) regime, the contribution from spin-exchange collisions is negligible and the cavity microcell can be used at higher temperatures, e.g., giving lower relaxation rate. The cavity microcell can be used both in SERF and total field magnetometer mode and the optimal buffer gas pressure ranges from few bars ($L_2$=1 mm) up to 20 bars ($L_2$=100 micron). All intermediate cases are covered by this design and fabrication technique.

For N spin-½ atoms with coherence time $T_2$=1/$\Gamma_{rel}$, the fundamental sensitivity is limited by the atomic quantum noise and, after a time of measurement much longer than coherence time t>>$T_2$ is given by:

$$\delta B = \frac{1}{\gamma} \sqrt{\frac{2\exp[1]}{NT_2 t}}$$

Since the total number of atoms N=nV is linear in each number density n and volume V, we can define the fundamental magnetic sensitivity per unit of volume (unit $Tcm^{3/2}/\sqrt{Hz}$):

$$\delta B_n = \frac{10^3}{\gamma} \sqrt{\frac{2\exp[1]\Gamma_{rel}}{nt}}$$

Figure 5:
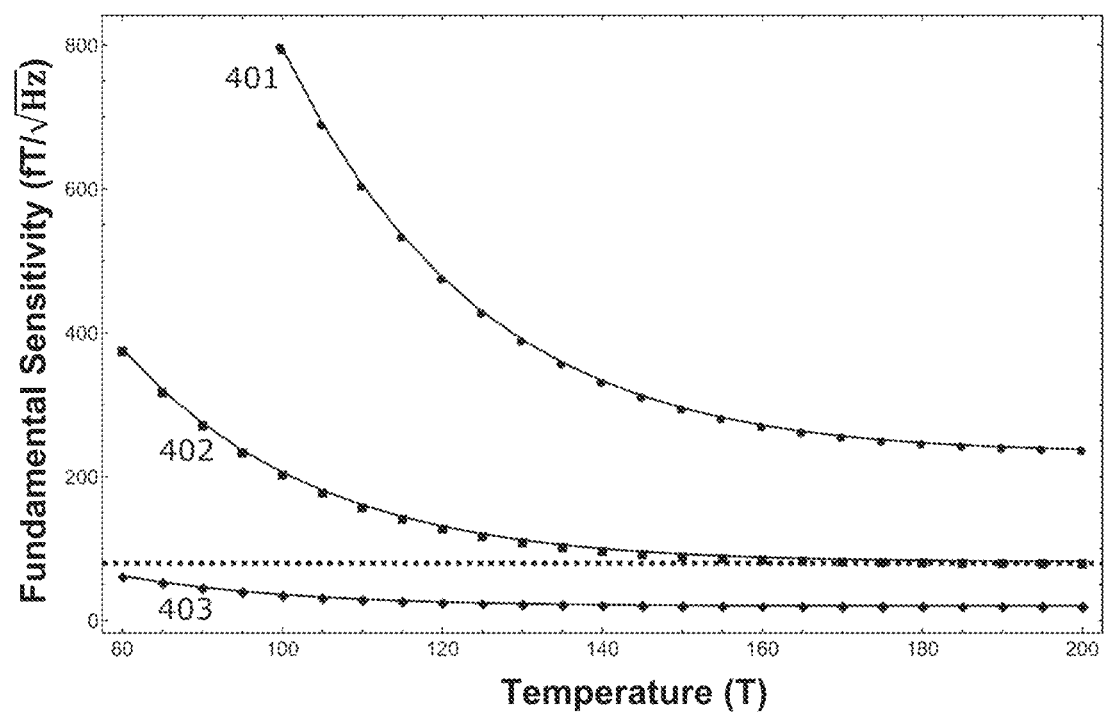
FIG. 5 illustrates exemplary fundamental sensitivity of the cavity microcell, for an embodiment.

In the above example at T=120° C., with optimal relaxation rate of $\Gamma_{rel}$=(2π)×1.2 kHz, the cavity microcell with sub-mm active volume of V=π$r^2$L=π(200 µm)$^3$ has a fundamental sensitivity of about 130 fT/$\sqrt{Hz}$ and a volume-adjusted sensitivity of about 1 fTcm$^{3/2}$/$\sqrt{Hz}$. This would decrease to sub- fTcm$^{3/2}$/$\sqrt{Hz}$ by increasing the atomic density at finite fields and even less in the SERF regime. This optimal volume-adjusted sensitivity is comparable with SOA sensitivity per unit of volume, obtained with OPMs at the cm size. FIG. 5 shows exemplary fundamental sensitivity for $L_2$ of 100 (401), 200 (402) and 500 (403) microns, respectively.

The present invention covers, but is not limited to, all sub-mm thickness conditions. Furthermore, atomic spin squeezing can improve the sensitivity below the standard quantum limit, and this is possible due to the high optical depth of the cavity microcell, not achievable with single pass miniaturized sensors (MEMS) as well as for the quantum-non-demolition nature of the dispersive measurement either in transmission or in reflection.

Figure 6:
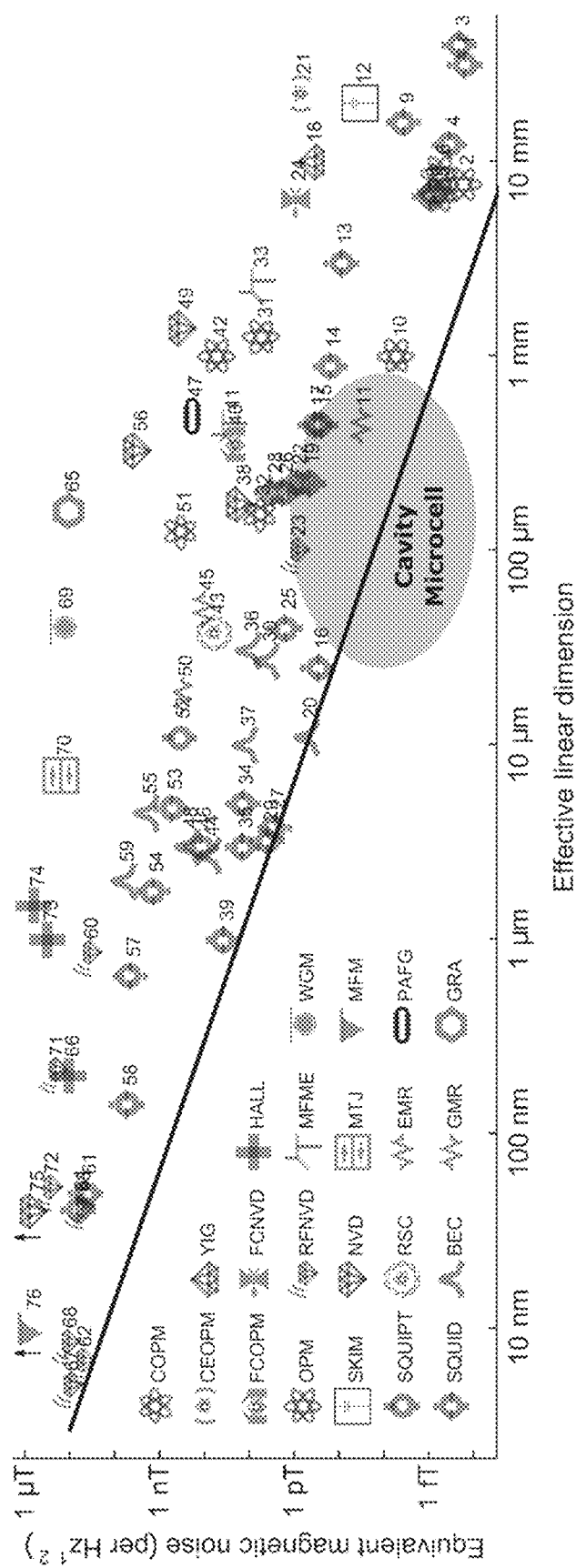
FIG. 6 illustrates the region of interest for cavity-microcell applications, for those embodiments of the cavity cell of the first aspect of the present invention for which the cavity cell is a cavity microcell.

FIG. 6 shows the interesting region for applications of the cavity microcell for an atomic gradiometer. In particular, the design of the cavity cell of the first aspect of the present invention enables state-of-the-art sensitivity of optically-pumped atomic magnetic gradiometry with sub-mm spatial resolution, improving what is currently achievable with SQUIDs and cm scale or miniaturized OPMs in terms of trade-off between sensitivity, sensor size and spatial resolution.

Microcavity-Enhanced Atomic Magnetic Gradiometer:

Two implementations of the above-described first and second main embodiments of the optically-pumped atomic magnetic gradiometer of the second aspect of the present invention are described below. Although they are described below for a cavity microcell, they are also valid and embraced by the present invention for a cavity cell with an atomic interaction length above 1 mm.

Specifically, an implementation of the first main embodiment is described with reference to FIG. 7, i.e., for a transmission detection mode operation, and an implementation of the second main embodiment is described with reference to FIG. 8, i.e., for a reflection detection mode operation.

Figure 7:
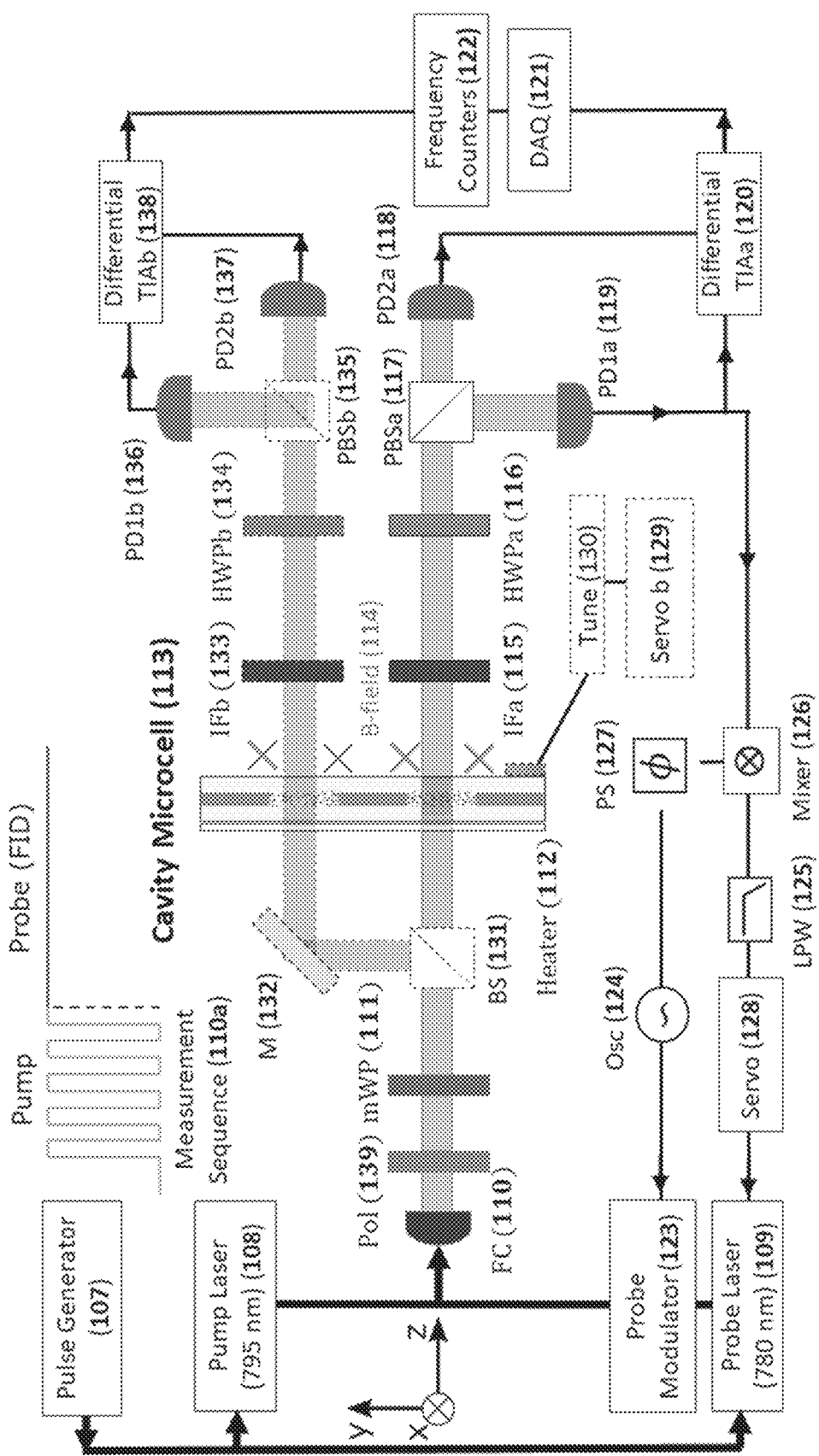
FIG. 7 schematically illustrates the optically-pumped atomic magnetic gradiometer of the second aspect of the present invention, for an implementation of the above described first main embodiment, i.e., for a transmission detection mode operation, for cavity-enhanced gradiometry with measurement in transmission (Faraday rotation detection).
Figure 8:
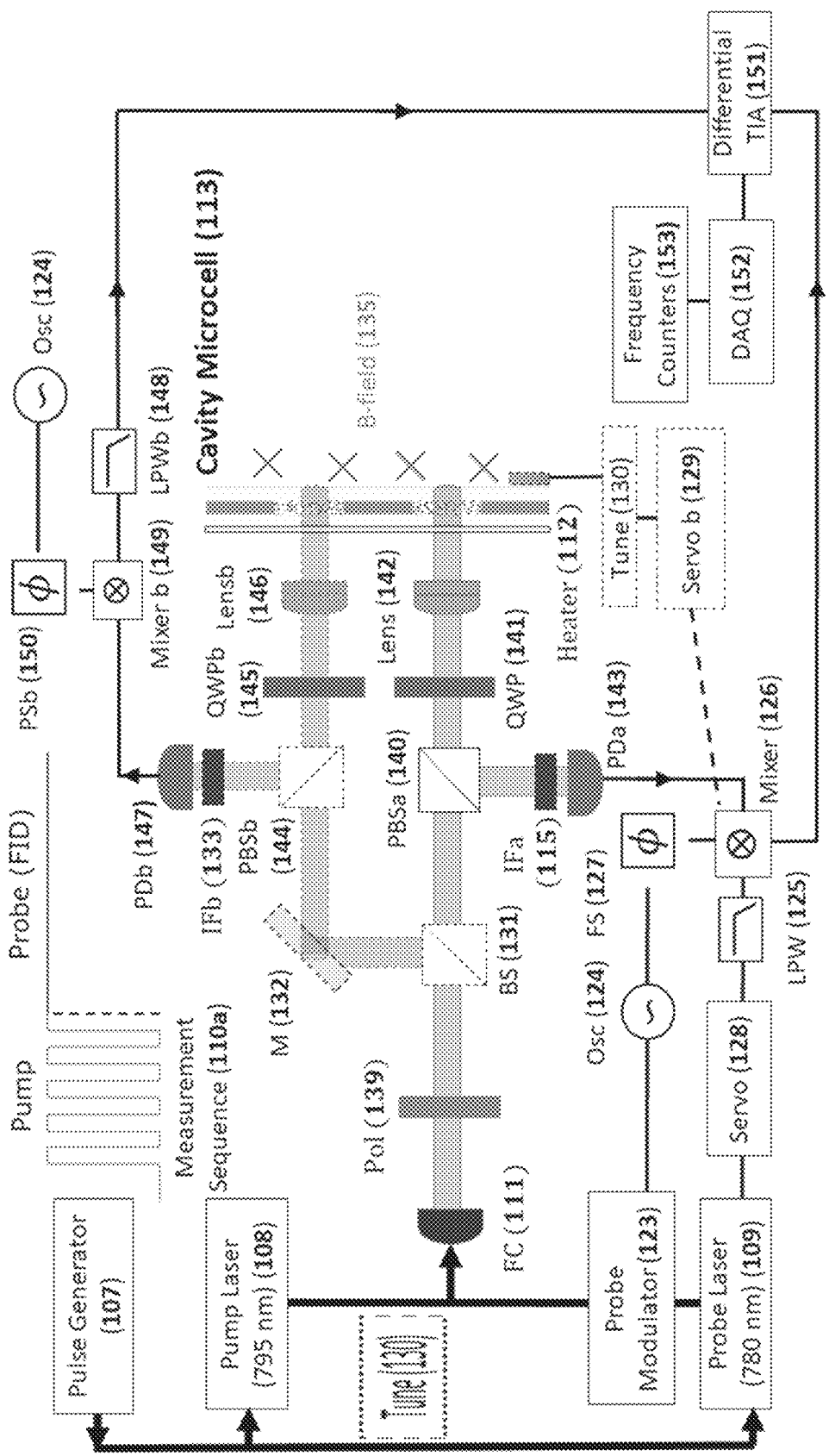
FIG. 8 schematically illustrates the optically-pumped atomic magnetic gradiometer of the second aspect of the present invention, for an implementation of the above described second main embodiment, i.e., for a reflection detection mode operation, for cavity-enhanced gradiometry with measurement in reflection (Pound-Drever-Hall detection).

The input optics and electronics are the same in both configurations, as shown in FIGS. 7 and 8, for some embodiments, and are therefore included in the gradiometer of the illustrated implementations of both of said first and second main embodiments, and their operation is described below. A pulse generator 107 drives the measurement sequence 110a. First, it triggers the pump laser 108 in a burst mode with high-power short pulses, synchronously with the Larmor precession frequency (Bell-Bloom operation mode), to generate maximum atomic polarization. Secondly, it triggers a CW (continuous Wave) probe beam 109 which propagates either in transmission (FIG. 7) or reflection (FIG. 8). Pump 108 and Probe 109 lasers are fibre coupled, by means of fibre coupler 110, and collimated in a collinear operation mode. Alternatively to fibre coupling (alternative no shown), the two lasers can propagate in free space and be aligned in the same mode through a dichroic mirror.

Indeed, pump and probe lights are meant to work at different frequencies, e.g., the pump light on resonance with the D1 line (e.g., 795 nm in Rb) and the probe far-detuned, Δ>10 GHz, from the D2 line (e.g., 780 nm in Rb). Collinear pump and probe beams propagate along the z axis, transverse with respect to the magnetic field to be measured in the x direction 114/135 and to the long side of the cavity microcell 113. The cavity microcell is heated to increase the atomic density in the device to the desired value and the temperature is stabilized using a sensor-feedback system, e.g., a thermocouple and a PID circuit. The heater 112 is meant to be transparent, e.g., ITO or resistive heater. It can be deposited directly on the device, e.g., resistive heater, or attached to the microcell as a separated component, e.g., ITO thin film. Heating wires 112 can also heat a ceramic oven, e.g., boron nitride or MACOR® ceramics, surrounding the cavity cell 113 with free optical access windows and additional thermal insulating material to enclose the device, e.g., TEFLON® or PEEK (Polyether Ether Ketone). Heaters and possible oven components must be non-magnetic, i.e. the heating current always follow double path with opposite direction to cancel residual magnetic noise. Hot air of fiberized heaters and transparent absorptive plates can also be used to heat up 112 the cavity microcell 113.

Detection in Transmission (Faraday Rotation):

For the transmission detection mode operation, as shown in FIG. 7, the following elements are included in the gradiometer, and their operation is described below. A linear polarizer 139 purifies the input polarization before a multi-order waveplate 111 linearly polarizes the probe light (e.g., 780 nm) and circularly polarize the pump beam (e.g., 795 nm). A beam splitter 131 and a reflective mirror 132 separate the single mode in two parallel beams, effectively giving two copies of the same optical system. This can be repeated providing multiple parallel beams for higher order gradiometer mode. Alternatively, one can use a single beam and multi-element photodiode, e.g., a quadrant photodiode with four active areas, or an array of photodiodes, or any other optical mechanism providing those multiple parallel beams.

In another embodiment (not illustrated), the same pump and probe beam is scanned to impinge on different cavities at different times.

From now on, the simplest option will be described, i.e., that with two parallel beams, top and bottom with respect to the y-direction, each comprising collinear pump and probe. The pulsed pump beam can last from few microseconds to milliseconds, depending on available power, impinges on the atomic ensemble in the microcell and its residual is absorbed by interference filters 115/133 that, on the other hand, transmit probe light.

Top/Bottom probe beams propagate through the cavity microcell undergoing cavity-enhanced Faraday rotation, which is detected by conventional balanced polarimeters of a measuring unit. Each one consists of a half-waveplate 116/134, polarizing beam splitter 117/135 and two photodiodes 118-119/136-137. The signals are subtracted and amplified in each polarimeter by a differential transimpedance amplifier (TIA) 120/138, also included in the measuring unit. The outputs, the two gradiometer channels, are fed into a data acquisition card (DAQ) 121 or to frequency counters 122, also part of the measuring unit, where a final differential measurement is performed.

The signal is processed with suitable software and electronics, also comprised by the measuring unit, to obtain Larmor frequency, magnetic field value and noise floor for each channel as well as magnetic field gradient with sub-mm spatial resolution and a baseline given by the distance between the two confining chambers that are probed. The noise is obtained in the frequency domain by repeating the same pump-probe measurement sequence 110a, driven by the pulse generator 107. One photodiode, e. g. 119 is used for continuously lock the probe laser frequency to the cavity length, via a PDH feedback circuit. The probe light is modulated 123, e.g., by an electro optical modulator (EOM), with a driving oscillator 124 so that the photodiode output 119 is mixed with the main oscillator using a low-pass filter 125, a mixer 126 and a phase shifter 127 to give an error signal centred around the resonance of the cavity microcell 113. A servo, e.g., PID controller, provides feedback to the probe laser current in order to keep the laser frequency locked to the cavity resonance frequency, which is far detuned from the atomic resonance, $\Delta>10$ GHz, to avoid probe absorption. An additional servo system 129 can work as secondary feedback to a system 130, e.g., piezo-electric transducer or additional thin film heater, for fine cavity tuning.

Figure 9A:
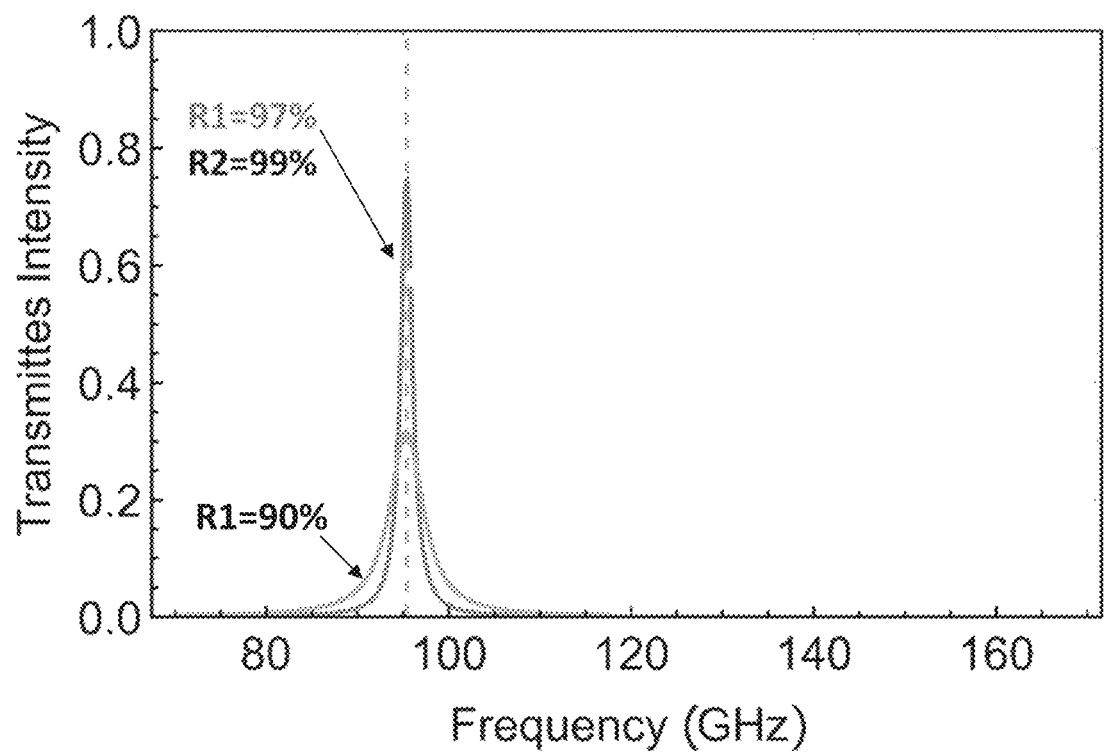
FIGS. 9A and 9B illustrate typical transmission peak and Faraday rotation FID (Free Induction Decay) signal obtained with the arrangement of FIG. 7.
Figure 9B:
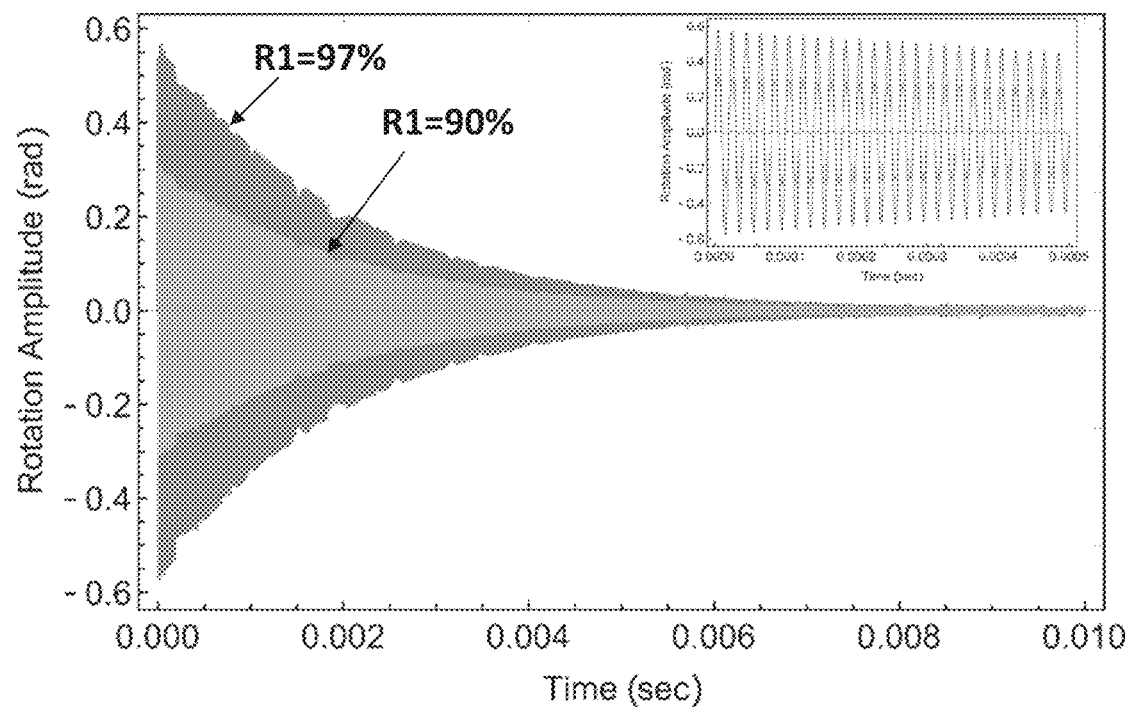

FIG. 9A shows exemplary transmitted intensity and FIG. 9B microcavity-enhanced Faraday rotation, for one gradiometer channel. In the graph of FIG. 9A, the probe frequency is scanned around cavity resonance (dashed line), far detuned from atomic resonance ($\Delta=95$ GHz). This signal is used to generate the PDH to lock the laser frequency on resonance, The microcavity-enhanced Faraday rotation signal in transmission is shown in the graph of FIG. 9B. In particular, two cavity conditions with second glass substrate reflectance R2=99% and first glass reflectance R1=90% and R1=97% were simulated, giving a cavity finesse of about 50 and 150, respectively. In the second case the gain in Faraday rotation is also higher, as described above, giving two orders of magnitude signal improvement, with respect to a single pass through $L_2=200$ micron. The reflectance of the substrates can vary in different embodiments, to optimize the trade-off between high-finesse and residual probe beam absorption. In the inset of FIG. 9B the same Faraday rotation signals are plotted over 0.5 msec to show clear polarization oscillations at the Larmor frequency $\omega_L=\gamma B_x$. The differential measurement between the two channels in a frequency counter provides the magnetic gradiometer signal.

Detection in Reflection (Pound-Drever-Hall):

For the reflection detection mode operation, as shown in FIG. 8, the following elements are included in the gradiometer, and their operation is described below. A polarizer 139 purifies the input linear polarization of both pump and probe beams. A beam splitter 131 and a reflective mirror 132 split the single mode in two beams. In both top and bottom beams a polarizing beam splitter 140/144 and a quarter waveplate 141/145 circularly polarize both collinear pump and probe lasers. They can be collimated or focused by a lens 142/146, depending on the desired beam radius at atomic interaction. A lens can also be replaced by a system of lenses, i.e. a telescope, for fine beam shaping. In this method, the second glass substrate has a reflectance close to 1, e.g., 99,99%.

The reflected probe light outputs are collected by photodiodes PDa/PDb 143/147 of a measuring unit and fed into a PDH laser frequency locking system to generate an error signal for each gradiometer channel. Such system is essentially the same described in the transmission method, comprising: a probe modulator 123, e.g., an electro optical modulator (EOM), a driving oscillator 124, a mixer 126/149 that combines the photodiode 143/147 output with the main oscillator, a low-pass filter 125/148 and a phase shifter 127/150.

The error signals are fed to a servo 128, e.g., PID controller, of the measuring unit, that provides a feedback signal, e.g., a dc voltage output, to the probe laser current in order to keep the laser frequency on resonance, following the cavity microcell displacement $\Delta L$. As previously described, an additional servo system 129 can give a secondary feedback signal to a fine-tuning system 130 applied to the cavity microcell 113.

The signal processing, performed by the measuring unit, can occur at different stages, by directly processing the reflected intensity or from the PDH error signals, where both show precession at the Larmor frequency and relaxation. The gradiometer measurement and the common mode noise rejection occur via a transimpedance differential amplifier 151 that subtracts the error signals from the two channels. Its output is then fed to DAQ 152 or frequency counter 153 to process the magnetic gradiometer signal.

Figure 10A:
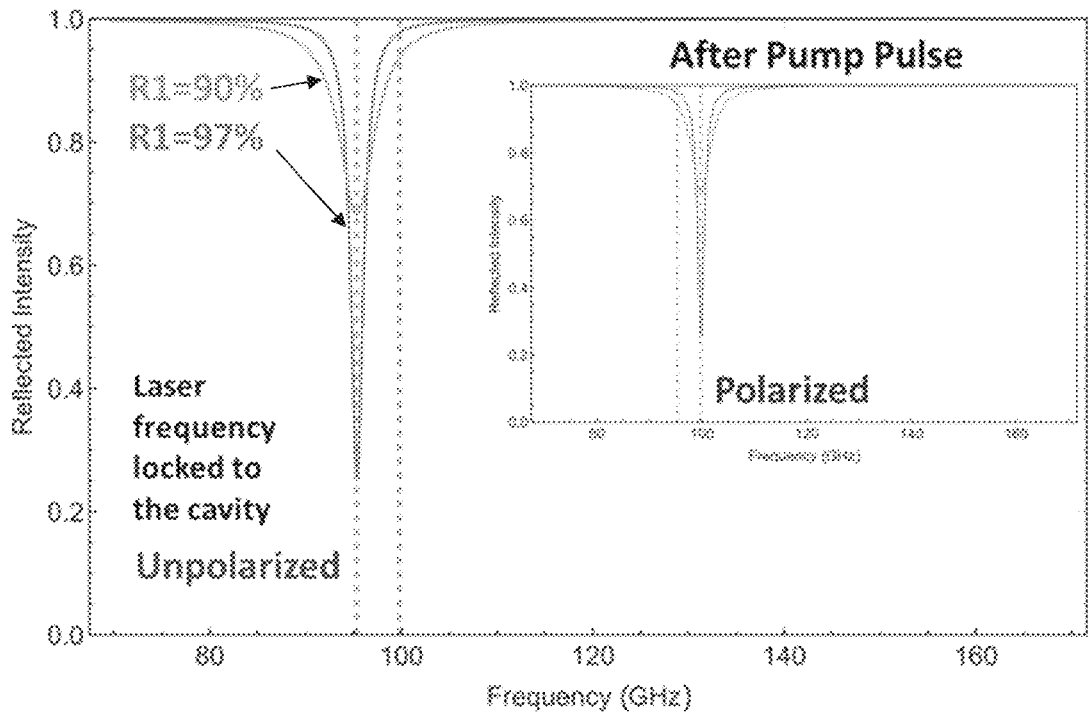
FIGS. 10A-10D illustrate typical reflection and PDH (Pound-Drever-Hall) signal obtained with the arrangement of FIG. 8.

In FIGS. 10A to 10D an exemplary reflected intensity and microcavity-enhanced PDH error signal for one gradiometer channel is reported. FIG. 10A shows the reflected intensity around a cavity resonance frequency corresponding to far-detuning ($\Delta=95$ GHz) from atomic resonance. This is used to generate the PDH error signal shown in FIG. 10C, with frequency sidebands due to the probe phase modulation. The probe laser frequency is initially locked to the cavity with unpolarized atoms. The optical pumping induces a shift of the cavity resonance condition with following free-induction-decay back to the unpolarized resonance condition. As for transmission, two microcavity-enhanced conditions with second glass substrate reflectance R2=99% and first glass reflectance R1=90% and R1=97% were simulated.

Figure 10B:
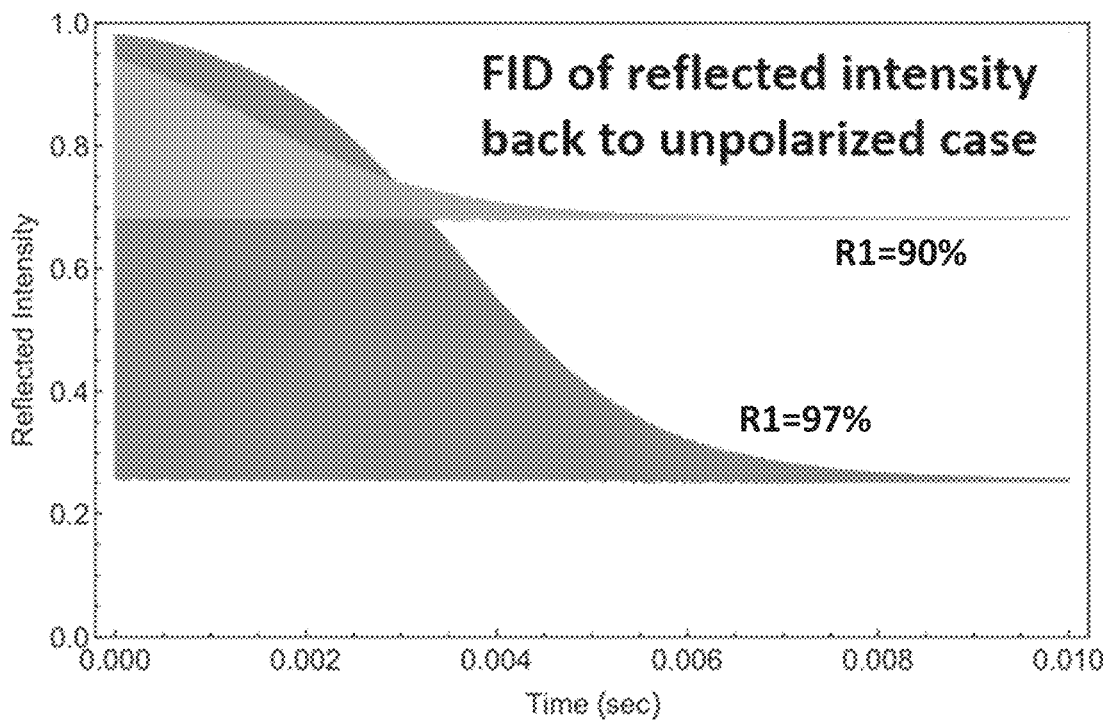
Figure 10C:
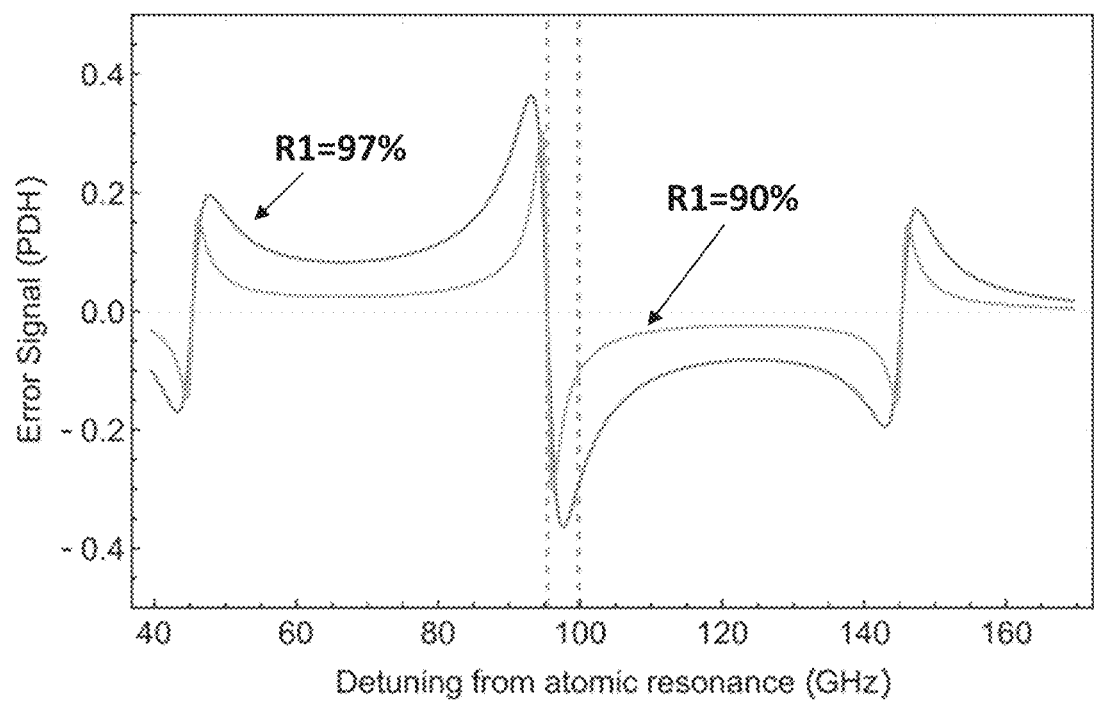
Figure 10D:
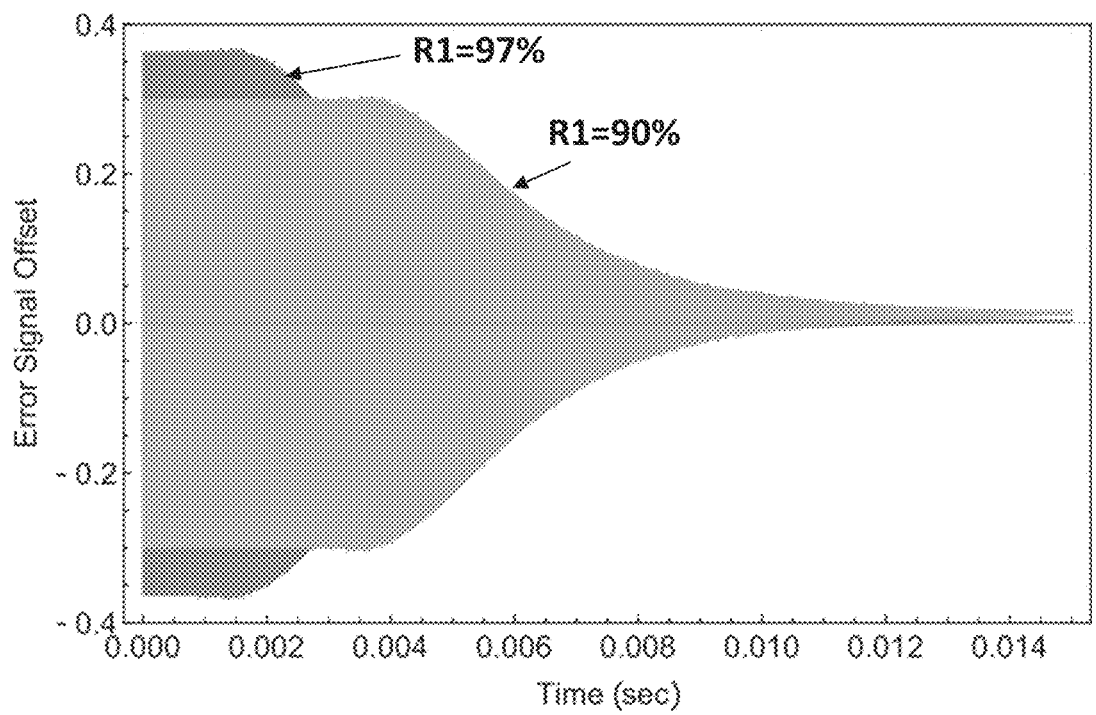

In FIG. 10B free-induction-decay of the reflected intensity for the two conditions with an amplitude improvement for higher finesse is plotted. Alternatively, the precession of the error signal can be used (FIG. 10D), which is proportional to the offset from cavity resonance, to perform the magnetic field measurement. Note that the cavity enhancement increases the error signal slope and the decay time in the free-induction-decay of the error signal offset.

Figure 11:
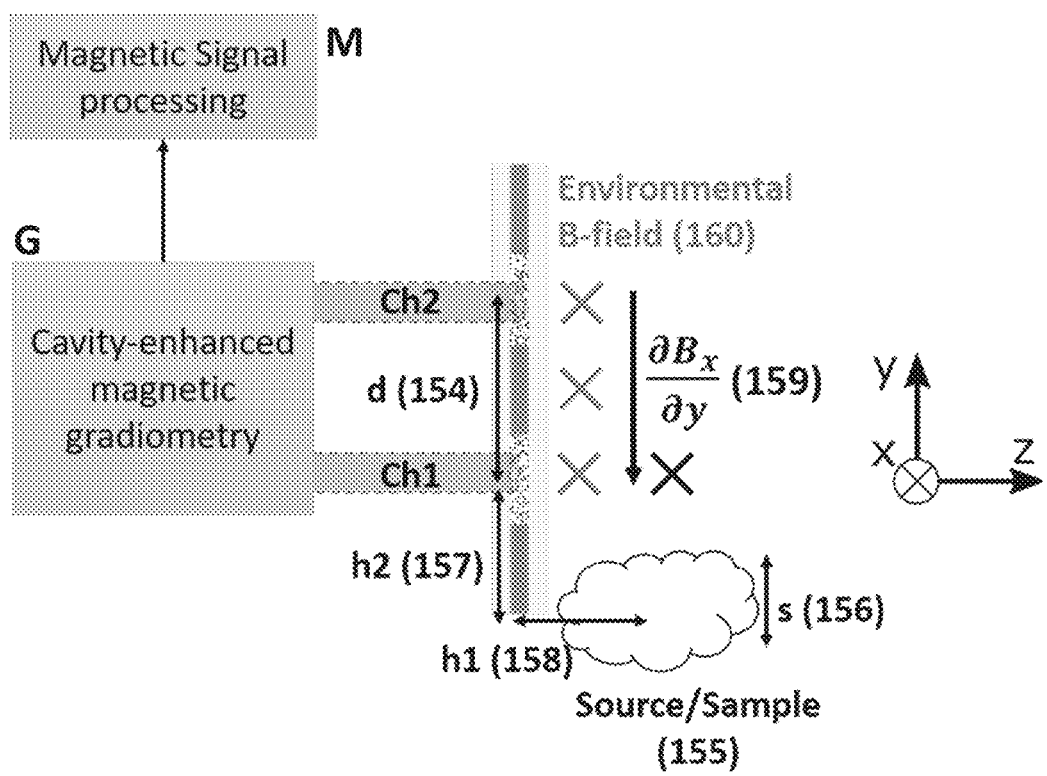
FIG. 11 schematically illustrates an application for sub-mm total field optical magnetic gradiometry, for an embodiment of the second aspect of the present invention.

FIG. 11 shows an exemplary application of the cavity cell and gradiometer of the present invention, particularly for an embodiment for which the gradiometer is a total field optical magnetic gradiometer. Two gradiometer channels Ch1, Ch2 are included with baseline d 154, which refers to the distance between two parallel beams probing, in the illustrated embodiment, two physics cavities 101*d* with baseline 101L (see FIG. 2B), or, for a non-illustrated embodiment, two ensembles within the same physics cavity 101*d* with baseline smaller than 101*j* (see FIG. 2B). In the Figure the optical and processing components of the gradiometer have been schematically depicted by means of blocks G and M.

If one beam is used, the gradiometer mode is obtained with a multi-element detector, e.g., a photodiode array, and d is set by the photodetector specs. In another embodiment (not shown), the same beam is scanned to impinge on different cavities at different times. A sample 155 is the source of the magnetic field $B_x$ to be measured. The sample can have sub-mm dimensions s, 156, and be at sub-mm distance h2, 157, from the first channel Ch1 of the cavity microcell gradiometer. However, the sample 155 can also be a distant macroscopic object generating a magnetic field of appreciable magnitude at the sensor position. In both cases, a magnetic gradient $\partial B_x/\partial B_y$, 159, can be measured by the cavity microcell with a baseline d. The magnetic gradient generated by the source adds to the magnetic environmental noise 160, e.g., Earth's field plus ambient noise sources, which is subtracted in the differential operation between the two gradiometer channels Ch1, Ch2. The distance h1 158 can be as small as the thickness of the top wall/substrate W1, e.g., 200 microns in the simulations performed by the present inventors.

The all-optical cavity microcell gradiometer is small, compact, and light, can operate with high-sensitivity in shielded as well as in unshielded environments and it has sub-mm spatial resolution. Then, the cavity microcell can be used as total field magnetic gradiometer in miniaturized systems on moving platforms, like unmanned aerial and underwater vehicles (UAV, UUV), satellites, cars, planes, and drones. It can also be applied in biomedical applications that need sub-mm resolution, working with sub-mm sources of magnetic field, for instance for magneto-encephalography (MEG) of small animals. A total field gradiometer operation with sub-mm resolution can be applied to the detection of magnetic fields from magnetic nano-particles and in general from any sub-mm magnetic source.

Figure 12:
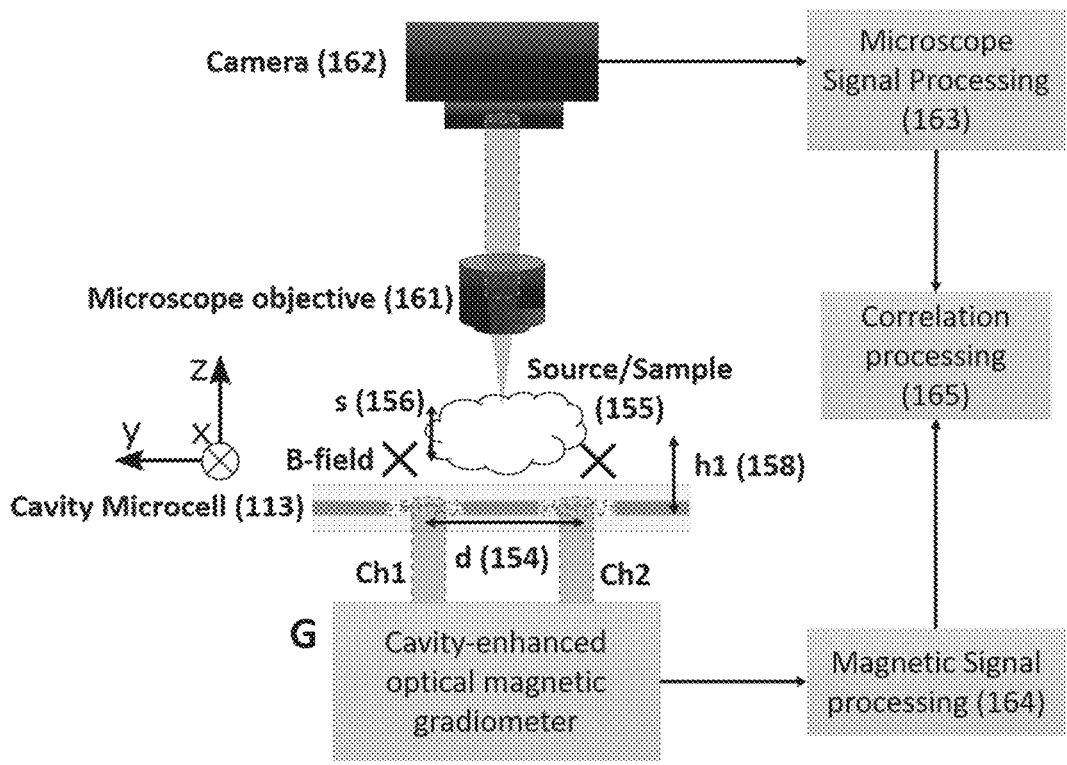
FIG. 12 schematically illustrates the system of the third aspect of the present invention, for an embodiment, referred below as optical magnetic microscopy.

Finally, an embodiment of the system of the third aspect of the present invention is shown in FIG. 12, which comprises:
the optically-pumped atomic magnetic gradiometer of the second aspect of the present invention, for the reflection mode operation;
a microscopy system configured and arranged to obtain microscopy information about a sample placed on or above a back side of the cavity cell opposite to its front side; and
a processing unit operatively connected to the measuring unit of the optically-pumped atomic magnetic gradiometer and to the microscopy system and configured to respectively receive magnetic gradiometry measurements and microscopy information and process them according to a correlation analysis.

Thus, the system of the third aspect of the present invention constitutes an exemplary application of the cavity cell of the first aspect of the present invention as an optical magnetic gradiometer in combination with an imaging system, referred herein as optical magnetic microscopy.

As shown in FIG. 12, for the embodiment there illustrated, the microscopy system comprises a microscope objective 161 and a camera 162 that provide images and information about a sample 155 with sub-mm resolution. The sample 155 is placed on the top of the cavity cell 113 at stand-off distance h1 158, which can be as small as the thickness of the top wall/substrate W1, e.g., 200 microns in simulations performed by the present inventors.

The magnetic information is obtained by the cavity-enhanced gradiometer optical setup G placed below the bottom wall/substrate W2, and including first and second channels Ch1, Ch2, since the measurement is performed in total reflection (see description above with reference to FIG. 8) with a baseline d 154.

The information from the microscope 163 and magnetic 164 signal processing can be combined in a correlation analysis processing 165, all such processing performed by a corresponding processing unit.

The magnetic detection by the cavity microcell 113 is non-invasive and can performed in alternative or in combination with standard invasive techniques, used for example in electrophysiology and optogenetics, and more in general with any microscopic characterization.

In the described optical magnetic microscopy, the sample could be:
A single neuron or functional neuronal domains with dimensions of hundreds micron:
Human or animal muscles, e.g., skeletal muscles;
Portion of retina/photoreceptors and human hair;
Bacteria, cancer cells, eukaryotic cells;
Pollen granules;
Microparticles and microspheres (drugs, ceramics, glass, polymers, and metals);

Although some of the above-described embodiments of the different aspects of the present invention have been described for a cavity microcell, they are also valid and embraced by the present invention for a cell with an atomic interaction length above 1 mm.

A person skilled in the art could introduce changes and modifications in the embodiments described without departing from the scope of the invention as it is defined in the attached claims.

What is claimed is:
1. A cell for an optically-pumped atomic magnetometer, comprising:
a first confining chamber containing alkali atoms, wherein said first confining chamber is configured to receive co-propagating pump and probe light beams, including pump light polarized to spin polarize the alkali atoms;
at least a second confining chamber containing alkali atoms, distanced from said first confining chamber, and which is also configured to receive co-propagating pump and probe light beams, wherein at least the first and second confining chambers are configured either to receive:
respective first co-propagating pump and probe light beams and second co-propagating pump and probe light beams, from a same side of the cell and striking at the first and second confining chambers at a same time; or
same co-propagating pump and probe beams, from a same side of the cell but striking at the first and second confining chambers at different times; and
top and bottom walls arranged at and covering opposite ends of at least the first and second confining chambers, wherein each of said top and bottom walls comprises an optical coating on an external face, wherein said optical coatings provide a partial reflectivity for the pump and probe lights of the co-propagating pump and probe light beams, thus making the cell become an optical cavity cell.

2. The cell of claim 1, wherein at least the first and second confining chambers are coplanar and comprise at least two physics chambers at distance from each other from 100 µm to 10 mm, the cell comprising further confining chambers including a reservoir and channels fluidically connecting said at least two physics chambers with said reservoir.

3. The cell of claim 1, wherein the at least first and second confining chambers have a confinement height below 1 mm.

4. The cell of claim 1, wherein said at least first and second confining chambers further contain a buffer gas at a pressure above 3 bar and up to 20 bar, to prevent atomic depolarizing collisions.

5. The cell of claim 2, wherein said at least two physics chambers have a width or diameter ranging from 100 µm to 10 mm.

6. An optically-pumped atomic magnetic gradiometer, comprising:
a first cell comprising a confining chamber containing alkali atoms, wherein said first confining chamber is configured to receive a co-propagating pump and probe light beams, including pump light polarized to spin polarize the alkali atoms;
a second confining chamber containing alkali atoms, distanced from said first confining chamber, and which is also configured to receive a co-propagating pump and probe light beams, wherein at least said first and second confining chambers are configured either to receive:
respective first co-propagating pump and probe light beams and second co-propagating pump and probe light beams, from a same side of the cell and striking at the first and second confining chambers at a same time, or
same co-propagating pump and probe beams, from a same side of the cell but striking at the first and second confining chambers at different times;
top and bottom walls arranged at and covering opposite ends of at least the first and second confining chambers, wherein each of said top and bottom walls comprises an optical coating on an external face, wherein said optical coatings provide a partial reflectivity for the pump and probe lights of the co-propagating pump and probe light beams, thus making the cell become an optical cavity cell;
an illumination mechanism configured to generate:
first co-propagating pump and probe light beams and a second co-propagating pump and probe light beams, and to direct the first and second co-propagating pump and probe light beams to different sensing chambers of a same side of the cell, namely a front side, such that the first co-propagating pump and probe light beams enter the first confining chamber, and the second co-propagating pump and probe light beams enter the second confining chamber; or
same co-propagating pump and probe light beams, and to direct the same co-propagating pump and probe light beams to different sensing chambers of a same side of the cell, a front side, to enter; and
a measuring unit configured and arranged to receive at least part of the probe lights of the first and second co-propagating pump and probe light beams, once coming out of the cell as first and second probe light beams, and perform a differential measurement between them, on at least one parameter of those probe light beams, to obtain a magnetic gradiometry measurement.

7. The optically-pumped atomic magnetic gradiometer of claim 6, wherein it operates according to a transmission detection mode, wherein the magnetic gradiometer further comprises:
a polarizing mechanism configured and arranged for linearly polarizing the probe light and circularly polarizing the pump light, of the first and second co-propagating pump and probe light beams, before they strike the front side of the cell; and
first and second optical components configured and arranged to respectively receive the first and second co-propagating pump and probe light beams, once coming out of the cell through a back side of the cell opposite to said front side, and transmit only the probe light contained in those beams, in the form of said first and second probe light beams;
wherein said measuring unit comprises first and second polarimeters configured and arranged to respectively receive said first and second probe light beams, and to detect Faraday rotation, and wherein said at least one parameter on which the measuring unit is configured to perform said differential measurement is Faraday rotation.

8. The optically-pumped atomic magnetic gradiometer of claim 7, wherein at least the first and second confining chambers of the cell are coplanar and comprise at least two physics chambers at distance from each other from 100 µm to 10 mm, the cell comprising further confining chambers including a reservoir and channels fluidically connecting said at least two physics chambers with said reservoir, the cell further comprising top and bottom walls arranged at and covering opposite ends of at least the first and second confining chambers and further confining chambers, wherein said first, second and further confining chambers are laterally demarcated and gas-tight sealed from the environment by intermediate partition and contour walls arranged between and bonded to said top and bottom walls, and wherein the bottom wall defines said front side of the cell and has a reflectivity for the probe light ranging between 90% and 99% and for the pump light below 50%, and the top wall has a reflectivity for the probe light ranging between 98% and 99.9%.

9. The optically-pumped atomic magnetic gradiometer of claim 6, wherein it operates according to a reflection detection mode, further comprising:
a polarizing mechanism configured and arranged for circularly polarizing both the probe light and the pump light, of the first and second co-propagating pump and probe light beams, before they strike the front side of the cell; and
wherein:
said measuring unit is configured to receive the first and second probe light beams of the first and second co-propagating pump and probe light beams, once coming out of the cell, by reflection, through the front side of the cell, and
said at least one parameter on which the measuring unit is configured to perform said differential measurement is:
light intensity of the first and second probe beams; or
PDH error signals provided by a Pound-Drever-Hall detection arrangement.

10. The optically-pumped atomic magnetic gradiometer of claim 9, wherein the cell further comprises top and bottom walls arranged at and covering opposite ends of at least the first and second confining chambers and further confining chambers, wherein said first, second and further confining chambers are laterally demarcated and gas-tight sealed from the environment by intermediate partition and contour walls arranged between and bonded to said top and bottom walls, wherein the bottom wall defines said front side of the cell and has a reflectivity for the probe light ranging between 90% and 99% and for the pump light below 50%, and the top wall has a reflectivity for the probe light equal or above 99.9% to reflect the pump light.

11. The optically-pumped atomic magnetic gradiometer of claim 6, wherein the probe light is locked on resonance with the cell but detuned from atomic resonance of the alkali atoms, so that absorption of probe light is negligible, and the measurement is dispersive.

12. A system, comprising:
an optically-pumped atomic magnetic gradiometer, comprising:
a cell comprising:
a first confining chamber containing alkali atoms, wherein said first confining chamber is configured to receive co-propagating pump and probe light beams, including pump light polarized to spin polarize the alkali atoms;
a second confining chamber containing alkali atoms, distanced from said first confining chamber, and which is also configured to receive co-propagating pump and probe light beams, wherein at least said first and second confining chambers are configured either to receive:
respective first co-propagating pump and probe light beams and second co-propagating pump and probe light beams, from a same side of the cell and striking at the first and second confining chambers at a same time, or same co-propagating pump and probe beams, from a same side of the cell but striking at the first and second confining chambers at different times;
top and bottom walls arranged at and covering opposite ends of at least the first and second confining chambers, wherein each of said top and bottom walls comprises an optical coating on an external face, wherein said optical coatings provide a partial reflectivity for the pump and probe lights of the co-propagating pump and probe light beams, thus making the cell become an optical cavity cell;
an illumination mechanism configured to generate:
first co-propagating pump and probe light beams and second co-propagating pump and probe light beams, and to direct the first and second co-propagating pump and probe light beams to different sensing chambers of a same side of the cell, a front side, such that the first co-propagating pump and probe light beams enter the first confining chamber, and the second pump and probe light beams enter the second confining chamber; or
same co-propagating pump and probe light beams, and to direct the same co-propagating pump and probe light beams to different sensing chambers of a same side of the cell, a front side, to enter the first and second confining chambers:
a measuring unit configured and arranged to receive at least part of the probe lights of the first and second co-propagating pump and probe light beams once coming out of the cell, in the form of first and second probe light beams, and perform a differential measurement between then, on at least one parameter of those probe light beams, to obtain a magnetic gradiometry measurement;
wherein the optically-pumped atomic magnetic gradiometer operates according to a reflection detection mode, further comprising:
a polarizing mechanism configured and arranged for circularly polarizing both the probe light and the pump light, of the first and second co-propagating pump and probe light beams, before they strike the front side of the cell; and
wherein:
said measuring unit is configured to receive the first and second probe light beams of the first and second co-propagating pump and probe light beams, once coming out of the cell, by reflection, through the front side of the cell, and
said at least one parameter on which the measuring unit is configured to perform said differential measurement is:
light intensity of the first and second probe beams; or
PDH error signals provided by a Pound-Drever-Hall detection arrangement;
a microscopy system configured and arranged to obtain microscopy information about a sample placed above a back side or on the top wall of the cell opposite to said front side; and
a processing unit operatively connected to the measuring unit of the optically-pumped atomic magnetic gradiometer and to the microscopy system and configured to respectively receive magnetic gradiometry measurements and microscopy information and process them according to a correlation analysis.

* * * * *